(12) United States Patent
Rao et al.

(10) Patent No.: US 11,689,282 B2
(45) Date of Patent: *Jun. 27, 2023

(54) CORRECTING TRAFFIC MISCONNECTIONS IN OPTICAL COMMUNICATIONS NETWORKS

(71) Applicant: Infinera Corporation, Sunnyvale, CA (US)

(72) Inventors: Rajan Rao, Fremont, CA (US); Steven J. Hand, Los Gatos, CA (US); Vasudha Bhaskara, Milpitas, CA (US)

(73) Assignee: Infinera Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/368,750

(22) Filed: Jul. 6, 2021

(65) Prior Publication Data

US 2022/0173804 A1 Jun. 2, 2022

Related U.S. Application Data

(63) Continuation of application No. 17/368,661, filed on Jul. 6, 2021, now Pat. No. 11,336,368.

(60) Provisional application No. 63/048,629, filed on Jul. 6, 2020.

(51) Int. Cl.
*H04B 17/00* (2015.01)
*H04B 10/03* (2013.01)
*H04B 10/077* (2013.01)

(52) U.S. Cl.
CPC .......... *H04B 10/03* (2013.01); *H04B 10/0771* (2013.01); *H04B 10/0773* (2013.01)

(58) Field of Classification Search
CPC . H04B 10/03; H04B 10/0771; H04B 10/0773
USPC .............................................. 398/13
See application file for complete search history.

(56) References Cited

U.S. PATENT DOCUMENTS

| 11,336,368 B2 * | 5/2022 | Rao ..................... H04B 10/0771 |
| 2010/0232795 A1 * | 9/2010 | Wang .................. H04J 14/0298 398/79 |
| 2015/0081855 A1 * | 3/2015 | Zhang ..................... H04L 41/40 709/220 |

\* cited by examiner

*Primary Examiner* — Mohammad R Sedighian
(74) *Attorney, Agent, or Firm* — David L. Soltz

(57) ABSTRACT

An example system includes a transceiver and a microcontroller. The microcontroller is configured to receive, from first and second network interfaces of the transceiver, a plurality of messages from a hub node and the leaf nodes. Each of the messages corresponds to a respective one of the ingress or egress data flows. The microcontroller is also configured generate a resource assignment map based on the messages. The resource assignment map includes pairings between a respective one of the ingress data flows and a respective one of the egress data flows, and, for each of the pairings, an indication of a respective network resource assigned to exchange the egress data flow of that pairing with a respective one of the leaf nodes. The microcontroller is also configured to generate a command to cause the transceiver to transmit the egress data flows in accordance with the resource assignment map.

6 Claims, 21 Drawing Sheets

CORRECTING TRAFFIC MISCONNECTIONS IN OPTICAL COMMUNICATIONS NETWORKS

CROSS REFERENCE TO RELATED APPLICATIONS

This application is a continuation of U.S. application Ser. No. 17/368,661, filed Jul. 6, 2021, and claims the benefit of U.S. Provisional Patent Application No. 63/048,629, filed Jul. 6, 2020, both of which are incorporated herein by reference in their entirety.

TECHNICAL FIELD

This disclosure relates to optical communications networks.

BACKGROUND

In an optical communications network, network nodes (e.g., computer devices) can exchange information using one or more of optical links (e.g., lengths of optical fiber) extending between them. For example, a first network node and a second network node can be interconnected by one or more optical links. The first network node can transmit data to the second network node by generating an optical signal, modulating the optical signal based on the data (e.g., using one more optical subcarriers), and transmitting the optical signal over the one or more optical links. The second node can receive the optical signal from the one or more optical links, and demodulate the optical signal to recover the data.

SUMMARY

In an aspect, a system includes a transceiver and a microcontroller. The transceiver includes one or more first network interfaces configured to be communicatively coupled to a hub node of an optical communications network, one or more second network interfaces configured to be communicatively coupled to a plurality of leaf nodes of the optical communications network, and a cross connect configured to interconnect the one or more first network interfaces selectively with the one or more second network interfaces. The microcontroller is communicatively coupled to the one or more first network interfaces, the one or more second network interfaces, and the cross connect. The microcontroller is configured to: receive, from the one or more first network interfaces, a plurality of first messages from the hub node, where each of the first messages corresponds to a different respective ingress data flow between the hub node and the transceiver; determine, for each of the ingress data flows, based on the first messages, one or more respective first logical identifiers associated with that ingress data flow; receive, from the one or more second network interfaces, a plurality of second messages from the leaf nodes, where each of the second messages corresponds to a different respective egress data flow between the transceiver and a respective one of the leaf nodes; determine, for each of the egress data flows, based on the second messages, one or more second logical identifiers associated with that egress data flow; generate a resource assignment map based on the first logical identifiers and the second logical identifiers; and generate a command to cause the transceiver to transmit the egress data flows in accordance with the resource assignment map. The resource assignment map includes an indication of one or more pairings between a respective one of the ingress data flows and a respective one of the egress data flows, and, for each of the pairings, an indication of a respective network resource assigned to transmit the egress data flow of the pairing to a respective one of the leaf nodes.

Implementations of this aspect can include one or more of the following features.

In some implementations, the first messages can include one or more Continuity Check Messages (CCMs) transmitted from the hub node to the transceiver.

In some implementations, the second messages can include one or more Continuity Check Messages (CCMs) transmitted from the leaf nodes to the transceiver.

In some implementations, the first messages can include one or more Ethernet Operations, Administration, and Maintenance (OAM) messages.

In some implementations, the second messages can include one or more Ethernet Operations, Administration, and Maintenance (OAM) messages.

In some implementations, the second messages can include one or more general communication channel (GCC) messages.

In some implementations, for each of the ingress data flows, the one or more first logical identifiers associated with that ingress data flow can include at least one of (i) an indication of a Maintenance Domain (MD) associated with that ingress data flow, (ii) an indication of a Maintenance Association (MA) associated with that ingress data flow, (iii) an indication of a Maintenance Association End Point (MEP) associated with that ingress data flow, or (iv) an indication of a network level associated with that ingress data flow.

In some implementations, for each of the egress data flows, the one or more second logical identifiers associated with that egress data flow can include at least one of (i) an indication of a Maintenance Domain (MD) associated with that egress data flow, (ii) an indication of a Maintenance Association (MA) associated with that egress data flow, (iii) an indication of a Maintenance Association End Point (MEP) associated with that egress data flow, or (iv) an indication of a network level associated with that egress data flow.

In some implementations, the microcontroller can be further configured to modify the resource assignment map based on the first logical identifiers and the second logical identifiers. Modifying the resource assignment map can include, for at least one of the pairings, modifying the network resource assigned to the pairing.

In some implementations, the network resource can include a plurality of optical subcarriers for transmitting data over the optical communications network.

In some implementations, the optical subcarriers can include Nyquist subcarriers.

In some implementations, the transceiver can include the microcontroller.

In some implementations, the microcontroller can be remote from the transceiver.

In some implementations, the one or more first network interfaces can include one or more Serializer/Deserializers (SerDes).

In another aspect, a system includes a transceiver and a microcontroller. The transceiver includes one or more first network interfaces for exchanging one or more ingress data flows with a hub node of an optical communications network, and one or more second network interfaces for exchanging one or more egress data flows with a plurality of leaf nodes of the optical communications network. The microcontroller is communicatively coupled to the one or more first network interfaces and the one or more second network interfaces. The microcontroller is configured to: receive, from the one or more first network interfaces and the one or more second network interfaces, a plurality of messages from the hub node and the leaf nodes, where each of the messages corresponds to a respective one of the one or more ingress data flows or a respective one of the one or more egress data flows; and generate a resource assignment map based on the messages. The resource assignment map includes an indication of one or more pairings between a respective one of the one or more ingress data flows and a respective one of the one or more egress data flows, and, for each of the one or more pairings, an indication of a respective network resource assigned to exchange the egress data flow of that pairing with a respective one of the leaf nodes. The microcontroller is also configured to generate a command to cause the transceiver to transmit the one or more egress data flows in accordance with the resource assignment map.

Implementations of this aspect can include one or more of the following features.

In some implementations, the messages can include one or more Continuity Check Messages (CCMs) transmitted from the hub node to the transceiver.

In some implementations, the messages can include one or more Continuity Check Messages (CCMs) transmitted from the leaf nodes to the transceiver.

In some implementations, at least one of the messages can be an Ethernet Operations, Administration, and Maintenance (OAM) message.

In some implementations, at least one of the messages can conform with the Institute of Electrical and Electronics Engineers (IEEE) 802.1Q-2018 technical standard.

In some implementations, at least one of the messages can be a general communication channel (GCC) message.

In another aspect, a system includes a transceiver and a microcontroller. The transceiver includes one or more first network interfaces for exchanging one or more ingress data flows data with a hub node of an optical communications network, and one or more second network interfaces for exchanging one or more egress data flows with a plurality of leaf nodes of the optical communications network. The microcontroller is communicatively coupled to the one or more first network interfaces and the one or more second network interfaces. The microcontroller is configured to: receive, from the one or more first network interfaces and the one or more second network interfaces, a plurality of messages from the hub node and the leaf nodes, where each of the messages corresponds to a respective one of the one or more ingress data flows or a respective one of the one or more egress data flows; and generate a resource assignment map based on the messages. The resource assignment map includes an indication of one or more pairings between a respective one of the one or more ingress data flows and a respective one of the one or more egress data flows, and, for each of the one or more pairings, an indication of a respective group of optical subcarriers assigned to exchange the egress data flow of that pairing to with respective one of the leaf nodes. The microcontroller is also configured to generate a command to cause the transceiver to transmit each of the one or more egress data flows using the corresponding group of optical subcarriers indicated in the resource assignment map.

Implementations of this aspect can include one or more of the following features.

In some implementations, at least one of the groups of optical subcarriers can include a single respective optical subcarrier.

In some implementations, at least one of the groups of optical subcarriers can include a plurality of respective optical subcarriers.

In some implementations, each of the groups of optical subcarriers can include one or more respective Nyquist subcarriers.

Other implementations are directed to systems, devices, and non-transitory, computer-readable media having instructions stored thereon, that when executed by one or more processors, cause the one or more processors to perform operations described herein.

The details of one or more implementations are set forth in the accompanying drawings and the description below. Other features and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
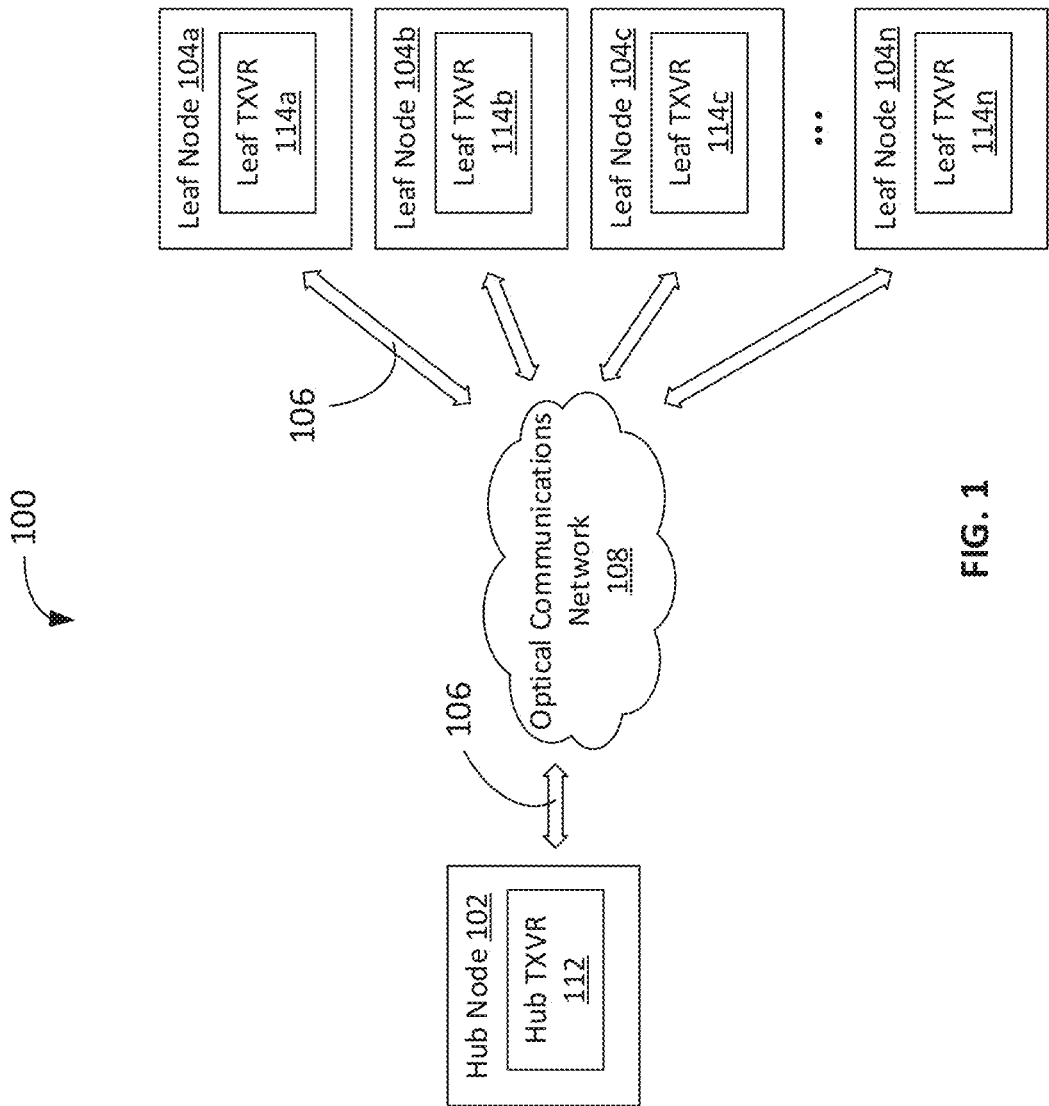
FIG. 1 is a diagram of an example system including network nodes and an optical communications network.

The present disclosure describes systems and techniques for correcting traffic misconnections in optical communications networks.

In some implementations, an optical communications network can include network nodes (e.g., computer devices) that are interconnected by one or more optical links (e.g., lengths of optical fiber). A network node can transmit data to another node using one or more of the optical links. For example, a first network node can transmit data to a second network node by generating an optical signal, modulating the optical signal based on the data (e.g., using one more optical subcarriers), and transmitting the optical signal over one or more optical links extending between them. The second node can receive the optical signal from the one or more optical links, and demodulate the optical signal to recover the data.

In some implementations, a network node can transmit data by generating optical signals that are modulated according to one or more optical subcarriers that are associated with the intended destination or destinations of the data. For example, a network node can receive data packets (e.g., from the network node itself and/or from another network node), ascertain the intended destination of each of the data packets, and identify one or more respective optical subcarriers that can be used to transmit data to each of those destinations. Based on this information, the network node can generate one or more optical signals, modulate the optical signals according to the identified optical subcarriers, and transmit the modulated optical signals over one or more optical links to each of the intended destinations.

As an example, a network node can receive a first set of data packets intended for a first destination network node and a second set of data packets intended for a second destination network node. Further, the network node can identify a first optical subcarrier that is allotted for transmitting data to the first destination network node, and a second optical subcarrier that is allotted for transmitting data to the second destination network node. Based on this information, the network node can generate a first optical signal, modulate the first optical signal based on the first data and according to the first optical subcarrier, and transmit the first optical signal to the first destination network node. Further, the network node can generate a second optical signal, modulate the second optical signal based on the second data and according to the second optical subcarrier, and transmit the second optical signal to the second destination network node. The first network destination node and the second network destination node can demodulate the respective optical signals to recover the data.

Further, in some implementations, a network node can generate an optical signal that is modulated according to multiple sets of optical subcarriers, where each set of optical subcarriers is associated with a different intended destination for data. Each of the intended destinations can receive an instance of the optical signal (e.g., a respective power-divided instance of the optical signal), and selectively demodulate the optical signal according to the set of optical subcarriers to which it is associated (e.g., to recover the data that is intended for it). Further, each of the intended destination can selectively ignore, block, or otherwise not demodulate the optical signal according to the sets of optical subcarriers to which it is not associated (e.g., such that it refrains from recovering the data that is not intended for it).

As an example, a network node can receive a first set of data packets intended for a first network destination node and a second set of data packets intended for a second destination network node. Further, the network node can identify a first optical subcarrier that is allotted for transmitting data to the first destination network node, and a second optical subcarrier that is allotted for transmitting data to the second destination network node. Based on this information, the network node can generate an optical signal, modulate the optical signal based on the first data and according to the first optical subcarrier, and modulate the optical signal based on the second data and according to the second optical subcarrier. Further, the network node can transmit an instance of the optical signal (e.g., a first power-divided instance of the optical signal) to the first destination network node and another instance of the optical signal (e.g., a second power-divided instance of the optical signal) to the second destination network node.

The first destination network node can demodulate the received optical signal according to the first optical subcarrier to recover the first set of data packets. Further, the first destination network node can refrain from demodulating the received optical signal according to the second optical subcarrier. Similarly, the second destination network node can demodulate the received optical signal according to the second optical subcarrier to recover the second set of data packets. Further, the second destination network node can refrain from demodulating the received optical signal according to the first optical subcarrier.

In some implementations, a control system automatically can assign network resources (e.g., optical subcarriers) to network nodes for transmitting and receiving data. For example, a set of candidate optical subcarriers can be allotted to several network nodes to exchange data with one another. In particular, each link between one network node and another (e.g., a downstream link and/or an upstream link) can be assigned one or more optical subcarrier from the set of candidate optical subcarriers that are dedicated to the transmission of data between those two network nodes.

In some implementations, optical subcarriers can be assigned based in the order in which the network nodes are connected to the network. As an example, a "hub" node may have eight candidate optical subcarriers available for transmitting and receiving data from several "leaf" nodes. When a first leaf node is connected to the hub node, a first group of optical subcarriers (e.g., including one or more optical subcarriers from the set of eight candidate optical subcarriers) can be assigned to exchange transmit data between the hub node and the first leaf node. Subsequently, when a second leaf node is connected to the hub node, a second group of optical subcarriers (e.g., including one or more optical subcarriers from the set of eight candidate optical subcarriers) can be assigned to exchange transmit data between the hub node and the second leaf node. Subsequently, when a third leaf node is connected to the hub node, a third group of optical subcarriers (e.g., including one or more optical subcarriers from the set of eight candidate optical subcarriers) can be assigned to exchange transmit data between the hub node and the third leaf node. This process can be repeated until each of the leaf nodes are connected to the hub node.

In some implementations, this arrangement could result in misconnections between the hub node and the leaf node. For example, a hub node may be configured to exchange data with a first leaf node using a first group of optical subcarriers, and exchange data with a second leaf node using a second group of optical subcarriers. However, due to a misconfiguration, the first leaf node may be configured to exchange data with the hub node using the second group of optical subcarriers, and the second leaf node may be configured to exchange data with the hub node using the first group of optical subcarriers. Accordingly, data may be misrouted between the hub node, the first leaf node, and the second leaf node.

The techniques described herein can be performed to correct or otherwise reduce the frequency of these misconnections and/or misconfigurations automatically.

As an example, in at least some implementations, a network device (e.g., a hub node, a leaf node, a remote control module, etc.) automatically can detect network links between network nodes of the network, and automatically determine the intended destination of data transmitted over those network links. Further, the network device automatically can detect misconnections between the network nodes (e.g., instances in which data intended for one network node is transmitted over a network link with to another network node instead), and automatically adjust a configuration one or more of the network nodes to correct the misconnection.

The techniques described herein can provide various technical benefits. As an example, in at least some implementations, the techniques described herein can eliminate and/or otherwise reduce the frequency of misconnections between network nodes. Accordingly, data can be transmitted more reliably using the optical communications network, for example in a manner that reduces data loss and/or retransmissions. As another example, in at least some implementations, the techniques described herein can be performed automatically by one or more network devices of the optical communications network (e.g., without manual input from a human user). Accordingly, the devices of the optical communications network can be deployed and maintained more efficiently.

In some implementations, at least some of the optical subcarriers described herein can be Nyquist subcarriers. A Nyquist subcarrier is a group of optical signals, each carrying data, where (i) the spectrum of each such optical signal within the group is sufficiently non-overlapping such that the optical signals remain distinguishable from each other in the frequency domain, and (ii) such group of optical signals is generated by modulation of light from a single laser. In general, each subcarrier may have an optical spectral bandwidth that is at least equal to the Nyquist frequency, as determined by the baud rate of such subcarrier.

Example systems and techniques for correcting traffic misconnections in optical communications networks are described in greater detail below and shown in the drawings.

I. Example Systems and Methods for Correcting Traffic Misconnections in Optical Communications Networks FIG. 1 shows an example system 100. The system 100 includes a hub node 102 and leaf nodes 104a-104n that are communicatively coupled to one another by optical links 106 in an optical communication network 108. In some implementations, the system 100 and/or the optical communications network 108 can be a part of one or more optical transport networks (OTNs), and/or can include one or more OTNs.

Each of the network nodes 102 and 104a-104n can include one or more respective computer devices (e.g., server computers, client computers, etc.). In some implementations, the network nodes can be configured such that each of the network nodes transmits data to and/or receives data from one or more other network nodes. As an example, the hub node 102 can be configured to transmit data to and/or receive data from one or more of the leaf nodes 104a-104n. In practice, the system 100 can include any number of network nodes greater than one (e.g., two, three, four, or more).

As also shown in FIG. 1, each of the network nodes 102 and 104a-104n includes one or more transceivers for transmitting and/or receiving data via the optical links 106 and the optical communications network 108. As an example, the hub node 102 can include a hub transceiver 112 that is coupled to one or more optical links 106. As another example, each of the leaf nodes 104a-104n can include a respective leaf transceiver 114a-114n that is coupled to one or more of the optical links 106.

In some implementations, the hub transceiver 112 and/or the leaf transceiver 114a-114n can be pluggable devices that are configured to enhance the functionality of the network nodes 102 and 104a-104n. For example, at least some of the hub transceiver 112 and/or the leaf transceiver 114a-114n can include a physical communications interface (e.g., a plug or socket) that is configured to reversibly insert into and/or receive corresponding physical communications interface of a network node 102 or 104a-104n, and exchange information with that network node to facilitate the performance of the operations described herein.

As shown in FIG. 1, the network nodes 102 and 104a-104n are communicatively coupled to one another by optical links 106 extending between them. Each of the optical links 106 can be implemented using one or more lengths of optical fiber and/or equipment interconnecting the optical fiber (e.g., line system components). In some implementations, the optical links 106 can collectively define at least a portion of the optical communications network 108.

As described above, in some implementations, a network node can transmit data by generating optical signals that are modulated according to one or more optical subcarriers that are associated with the intended destination or destinations of the data. For example, the hub node 102 can receive data packets (e.g., from the hub node 102 itself and/or from another network node), ascertain the intended destination of each of the data packets, and identify one or more respective optical subcarriers that can be used to transmit data to each of those destinations. Based on this information, the hub node 102 can generate one or more optical signals (e.g., using one or more light emitters, such as laser emitters), modulate the optical signals according to the identified optical subcarriers (e.g., using one or more local oscillators, multiplexers, etc.), and transmit the modulated optical signals over one or more optical links to each of the intended destinations (e.g., one or more of the leaf nodes 104-104n).

Further, as described above, a network node can generate an optical signal that is modulated according to multiple sets of optical subcarriers, where each set of optical subcarriers is associated with a different intended destination for data. Each of the network nodes can selectively recover the data stream that is intended for it (e.g., by detecting the optical signals using one or more photodetectors, and demodulating the optical signal according to the set of optical subcarriers that is associated with the network node, such as using one or more local oscillators). Further, each of the network nodes that refrain from recovering the data streams that are intended for other network nodes.

For example, referring to FIG. 1, the hub node 102 can generate an optical signal that is modulated according to multiple sets of optical subcarriers, where each set of optical subcarriers is associated with a different one of the leaf nodes 104a-104n. Further, the hub node 102 can transmit a respective power-divided instance of the optical signal to each of the leaf nodes 104a-104n. For example, if the total power of the optical signal is $P_{total}$, the power of each of the instances of the optical signal that are transmitted to the leaf nodes 104a-104n can be $P_1, P_2, \ldots, P_n$, respectively, where $P_{total} = P_1 + P_2 + \ldots + P_n$.

Further, each of the leaf nodes 104a-104n can receive a respective instance of the optical signal, and selectively demodulate that instance of the optical signal according to the set of optical subcarriers to which it is assigned (e.g., to recover the data that is intended for it). Further, each of the leaf nodes 104a-104n can selectively ignore, block, or otherwise not demodulate the respective optical signal according to the sets of optical subcarriers to which it is not assigned (e.g., such that it refrains from recovering the data that is not intended for it).

Figure 2A:
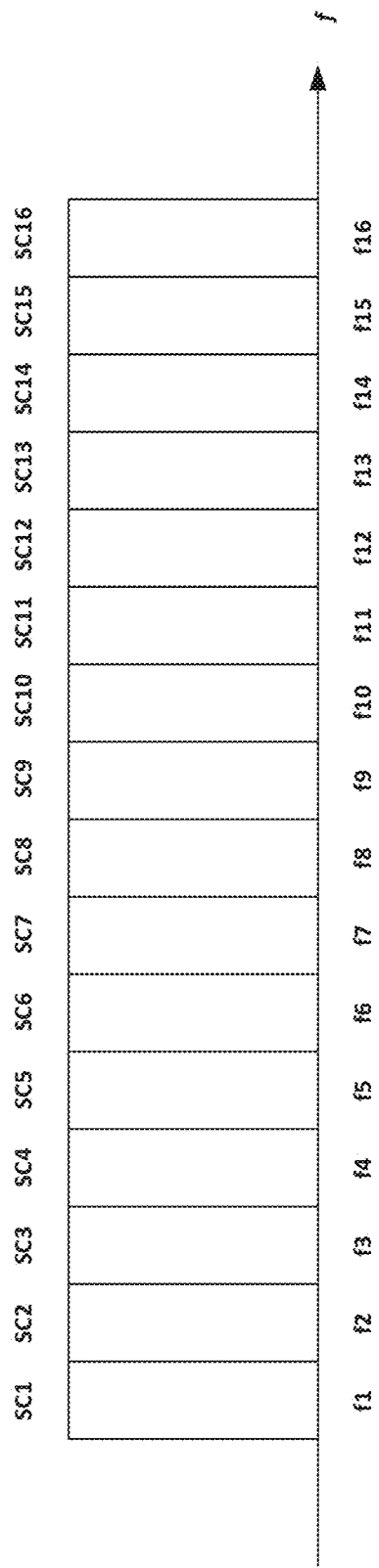
FIGS. 2A and 2B are diagrams of optical subcarriers according to a frequency domain.

FIG. 2A shows example sets of optical subcarriers SC1-SC16 that may be made available for use by the hub node 102 and the leaf nodes 104a-104n. In this example, the optical subcarriers SC1-SC16 (corresponding to frequencies f1-f16) are available for exchanging data between the hub node 102 and the leaf nodes 104a-104n. Further, each of the optical subcarriers SC1-SC16 are spectrally contiguous with respect to the frequency domain (e.g., the frequencies f1-f16 define a continuous range of frequencies).

In an example configuration, the hub node 102 and the leaf node 104a can be assigned the optical subcarrier SC1 for exchanging data between them. Further, the hub node 102 and the leaf node 104b can be assigned the optical subcarrier SC2 for exchanging data between them. Further still, the hub node 102 and the leaf node 104c can be assigned the optical subcarrier SC3 for exchanging data between them. The other optical subcarriers can be assigned in a similar manner to facilitate the exchange of data between other pairings of the hub node 102 and the leaf nodes.

Figure 2B:
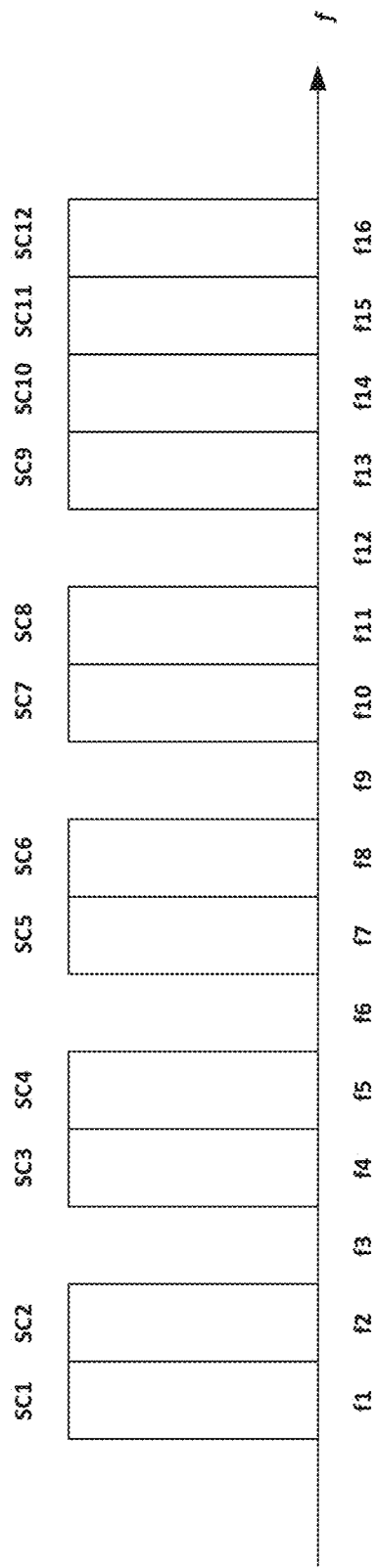

FIG. 2B shows further example sets of optical subcarriers SC1-SC12 that may be made available for use by the hub node 102 and the leaf nodes 104a-104n. In this example, the optical subcarriers SC1-SC12 (corresponding to frequencies f1-f12) are available for exchanging data between the hub node 102 and the leaf nodes 104a-104n. Further, groups of the optical subcarriers SC1-SC12 are spectrally separated from one another by guard bands. For example, a guard band having a frequency f3 separates the optical subcarriers SC1 and SC2 (corresponding to frequencies f1 and f2) from the optical subcarriers SC3 and SC4 (corresponding to frequencies f4 and f5) in the frequency domain. As another example, a guard band having a frequency f6 separates the optical subcarriers SC3 and SC4 (corresponding to frequencies f4 and f5) from the optical subcarriers SC5 and SC6 (corresponding to frequencies f7 and f8) in the frequency domain.

In an example configuration, the hub node 102 and the leaf node 104a can be assigned the optical subcarriers SC1 and SC2 for exchanging data between them. Further, the hub node 102 and the leaf node 104b can be assigned the optical subcarriers SC3 and SC4 for exchanging data between them. Further still, the hub node 102 and the leaf node 104c can be assigned the optical subcarriers SC5 and SC6 for exchanging data between them. The other optical subcarriers can be assigned in a similar manner to facilitate the exchange of data between other pairings of the hub node 102 and the leaf nodes.

In some implementations, a single optical subcarrier can be allocated to transmit data between two respective network nodes. In some implementations, multiple optical subcarriers (e.g., two, three, four, or more) can be allocated to transmit data between two respective network nodes.

In some implementations, at least some of the subcarriers described herein can be Nyquist subcarriers. A Nyquist subcarrier is a group of optical signals, each carrying data, where (i) the spectrum of each such optical signal within the group is sufficiently non-overlapping such that the optical signals remain distinguishable from each other in the frequency domain, and (ii) such group of optical signals is generated by modulation of light from a single laser. In general, each subcarrier may have an optical spectral bandwidth that is at least equal to the Nyquist frequency, as determined by the baud rate of such subcarrier.

Although FIGS. 2 and 2B show example configurations of optical subcarriers, these are merely illustrative examples. In practice, any number of optical subcarriers can be used by the network nodes 102 and 104a-104n to exchange data. Further, some, none, or all of optical subcarriers can be spectrally contiguous with one another with respect to the frequency domain. Further, some, none, or all of optical subcarriers can be spectrally separated from one another with respect to the frequency domain (e.g., such that one or more guard bands are positioned spectrally between adjacent optical subcarriers in the frequency domain).

Figure 3:
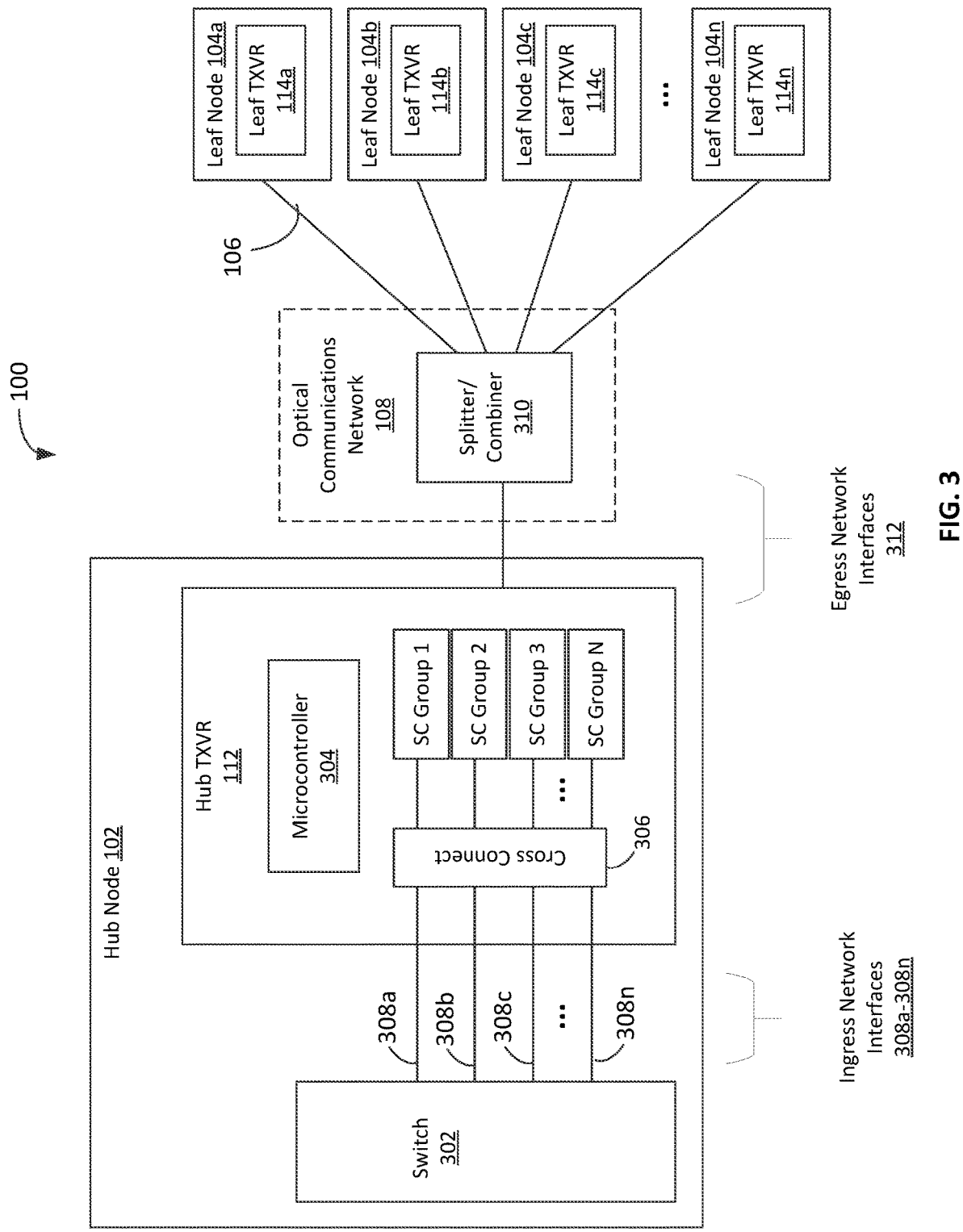
FIG. 3 is a diagram showing the system of FIG. 1 in greater detail.

FIG. 3 shows the system 100 in greater detail according to some implementations.

As shown in FIG. 3, the hub node 102 includes a switch 302 for routing data to the hub transceiver 112 and/or receiving data from the hub transceiver 112. In some implementations, the switch 302 can receive data from the hub node 102 itself and/or from other network nodes, and provide at least some of the data to the hub transceiver 112 for transmission to one or more of the leaf nodes 104a-104n. In some implementations, the switch 302 can receive data from one or more of the leaf nodes 104a-104n, and provide at least some of the data to the hub node 102 itself and/or other network nodes. In some implementations, the switch 302 can transmit and/or receive data according to a Layer 2 (L2) or a Layer 3 (L3) of a network architecture (e.g., an architecture having a seven layer Open Systems Interconnection (OSI) network model).

As also shown in FIG. 3, the hub transceiver 112 includes a microcontroller 304 and a cross connect 306. The microcontroller 304 is configured to control the transmission and/or reception of data by the hub transceiver 112 according to different groups of optical subcarriers. As an example, the microcontroller can detect an optical link between the hub node 102 and the leaf node 104a, and assign a first group of optical subcarriers ("SC Group 1") for use in exchanging data between the two network nodes. Further, the microcontroller can detect an optical link between the hub node 102 and the leaf node 104b, and assign a second group of optical subcarriers ("SC Group 2") for use in exchanging data between the two network nodes. Further, the microcontroller can detect an optical link between the hub node 102 and the leaf node 104c, and assign a third group of optical subcarriers ("SC Group 3") for use in exchanging data between the two network nodes. Further, the microcontroller can detect an optical link between the hub node 102 and the leaf node 104n, and assign a fourth group of optical subcarriers ("SC Group 4") for use in exchanging data between the two network nodes.

Further still, the microcontroller can control the cross connect 306, such that data that is received from the switch 302 (e.g., via ingress network interfaces 308a-308n) is used to modulate optical signals according to one of the groups of optical subcarriers, depending on the intended destination of that data. For example, the switch 302 can transmit data intended to the leaf node 104a using a first ingress network 308a. Using the cross connect 306, the microcontroller 304 can route the data such that an optical signal is modulated according to the data and the first group of optical subcarriers. As another example, the switch 302 can transmit data intended to the second node 104b using a first ingress network 308b. Using the cross connect 306, the microcontroller 304 can route the data such that an optical signal is modulated according to the data and the second group of optical subcarriers. Data intended for other ones of the leaf nodes 104c-104n can be routed by the microcontroller 304 and a cross connect 306 in a similar manner as described above.

In some implementations, the cross connect 306 can be implemented using hardware (e.g., one or more physical switches, wires, cables, jumpers, registers, circuitry, etc.), software (e.g., one or more software or firmware switches, registers, etc.), or a combination thereof.

As shown in FIG. 3, the hub transceiver 112 can generate one or more optical signals, and transmit the optical signals (e.g., via one or more egress network interfaces 312) to an optical splitter/combiner 310 of the optical communications network 108. For example, hub transceiver 112 can generate an optical signal that is modulated according to multiple sets of optical subcarriers (e.g., SC Groups 1-4), where each set of optical subcarriers is associated with a different one of the leaf nodes 104a-104n. Further, the hub transceiver 112 can provide the optical signal to the splitter/combiner 310, which splits the optical signal into several power-divided instances of the optical signal. Each of the power-divided instances of the optical signal can be transmitted to a respective one of the leaf nodes 104a-104n (e.g., via an optical link 106).

In some implementations, at least some of the ingress network interfaces 308a-308n can include an Ethernet interface, an OTN interface, and/or a Serializer/Deserializer (SerDes) interface. Further, at least some of the egress network interfaces 312 can include a SerDes interface.

As described above, the system 100 automatically can detect misconnections between network nodes (e.g., instances in which data intended for one network node is transmitted over a network link with to another network node instead), and automatically adjust a configuration one or more of the network nodes to correct the misconnection. In some implementations, network nodes can coordinate their configurations by exchanging configuration data with other network nodes, adjusting their own configurations, and/or transmitting commands that instruct other network nodes to change their configurations.

Figure 4:
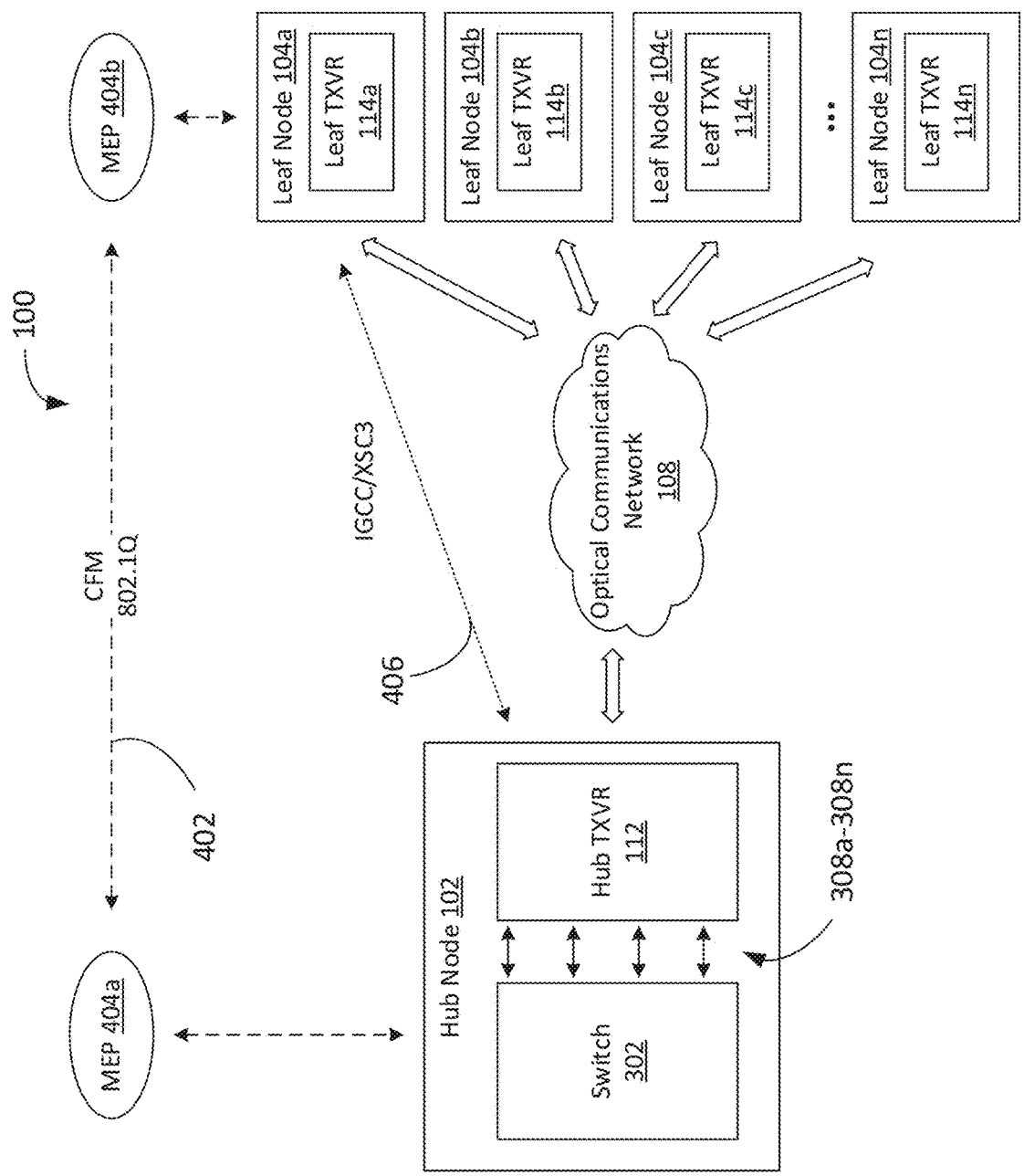
FIG. 4 is a diagram of example communications channels between network nodes of the system shown in FIG. 1.

As shown in FIG. 4, in some implementations, network nodes can exchange configuration data and/or commands through one or more Ethernet connection fault management (CFM) communications channels, such as a CFM channel 402 established according to the Institute of Electrical and Electronics Engineers (IEEE) 802.1 technical standards (e.g., IEEE 802.1Q-2018 technical standard). In some implementations, a CFM channel 402 can established between the hub node 102 and one or more of the leaf nodes 104a-104n via maintenance associate end points (MEPs), each associated with one or more of the hub node 102 and one or more of the leaf nodes 104a-104n.

As an example, a hub node 102 can transmit configuration data and/or commands intended for the leaf node 104a to an MEP 404a (e.g., an MEP associated with the hub node 102). Further, the MEP 404a can identify an MEP associated with the leaf node 104a (e.g., an MEP 404b), and transmit at least some of the configuration data and/or commands to the MEP 404b. In turn, the MEP 404b can provide at least some of the configuration data and/or commands to the leaf node 104a to further processing and/or execution.

As another example, network nodes can exchange configuration data and/or commands through one or more general communication channels (GCC) 406.

In some implementations, GCC 406 can include one or more in-band side channels used to carry transmission management and signaling information within optical transport network elements. Further, a GCC can support generalized multi-protocol label switching (GMPLS), protection signaling, and network management traffic for nodes. In some implementations, an in-band GCC may be referred to as an IGCC.

In some implementations, a GCC 406 can include one or more out-of-band channels used to carry transmission management and signaling information within optical transport network elements. As an example, as described above, data traffic can be transmitted between two nodes by modulating an optical signal including one or more optical subcarriers, each optical subcarrier being modulated quadrature amplitude (QAM) modulated at a first frequency to carry user data. In some implementation, the optical subcarriers are generated by modulating light output from a laser. In addition, the optical subcarriers can be further modulated (e.g., amplitude modulated or AM modulated) by at one or more second frequencies to carry management and signaling information). In some implementations, the second frequencies can be less than the first frequencies. In some implementations, an out-of-band GCC may be referred to as an XSC3 channel. Accordingly, the optical subcarriers carry both user information and control information, but the control information is transmitted at a lower rate than the user information or data. In a further example, selected optical subcarriers may be AM modulated but do not carry user data, while other optical subcarriers are QAM modulated to carry user data, but are not AM modulated and do not carry control information.

In some implementations, an GCC 406 can established directly between the hub node 102 and one or more of the leaf nodes 104a-104n (e.g., as shown in FIG. 4).

Other communications channels for exchanging configuration data and/or commands are also possible, either instead of or in addition to those described herein.

Figure 5A:
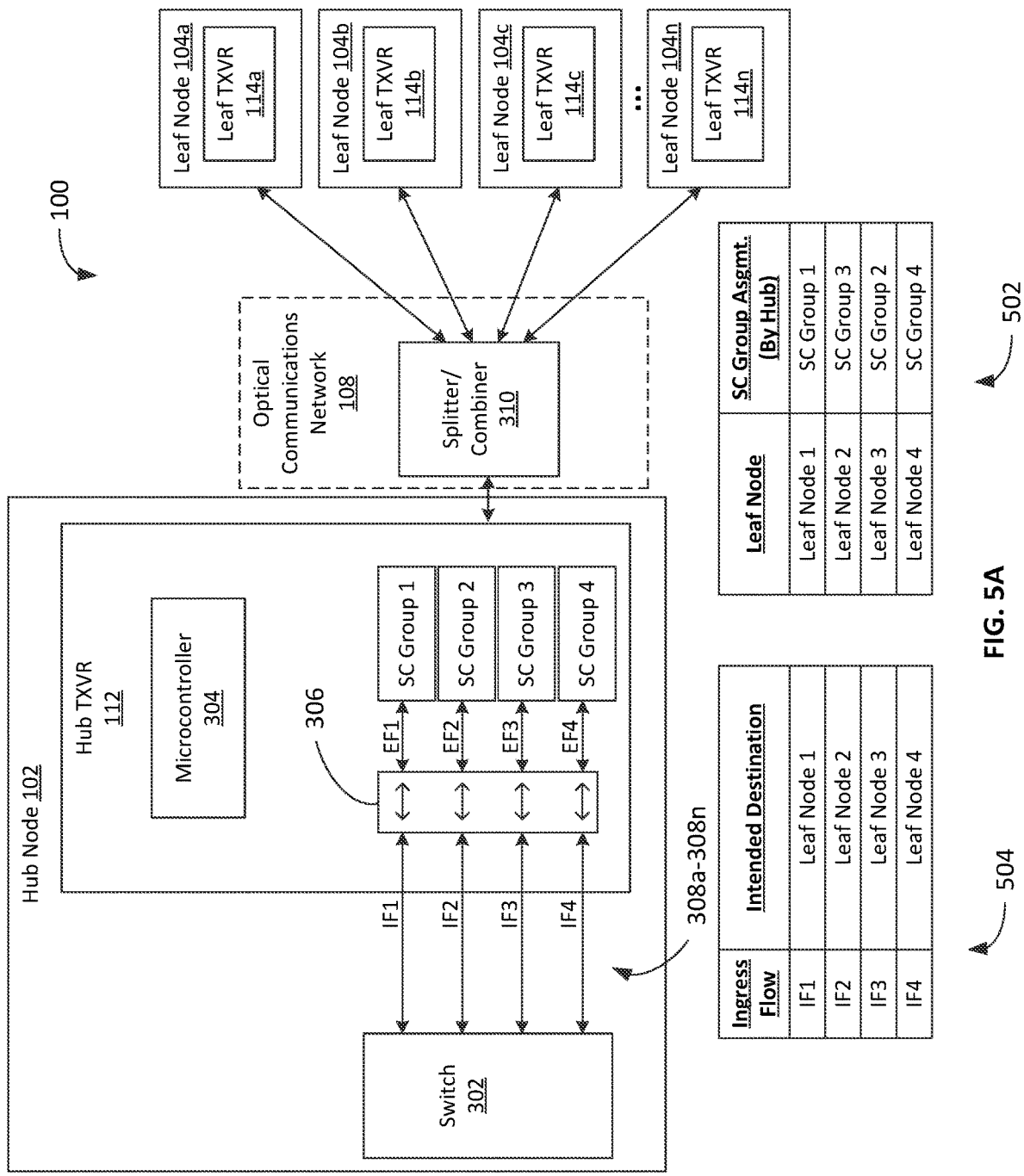
FIGS. 5A-5C show an example operation of the system shown in FIG. 1.
Figure 5B:
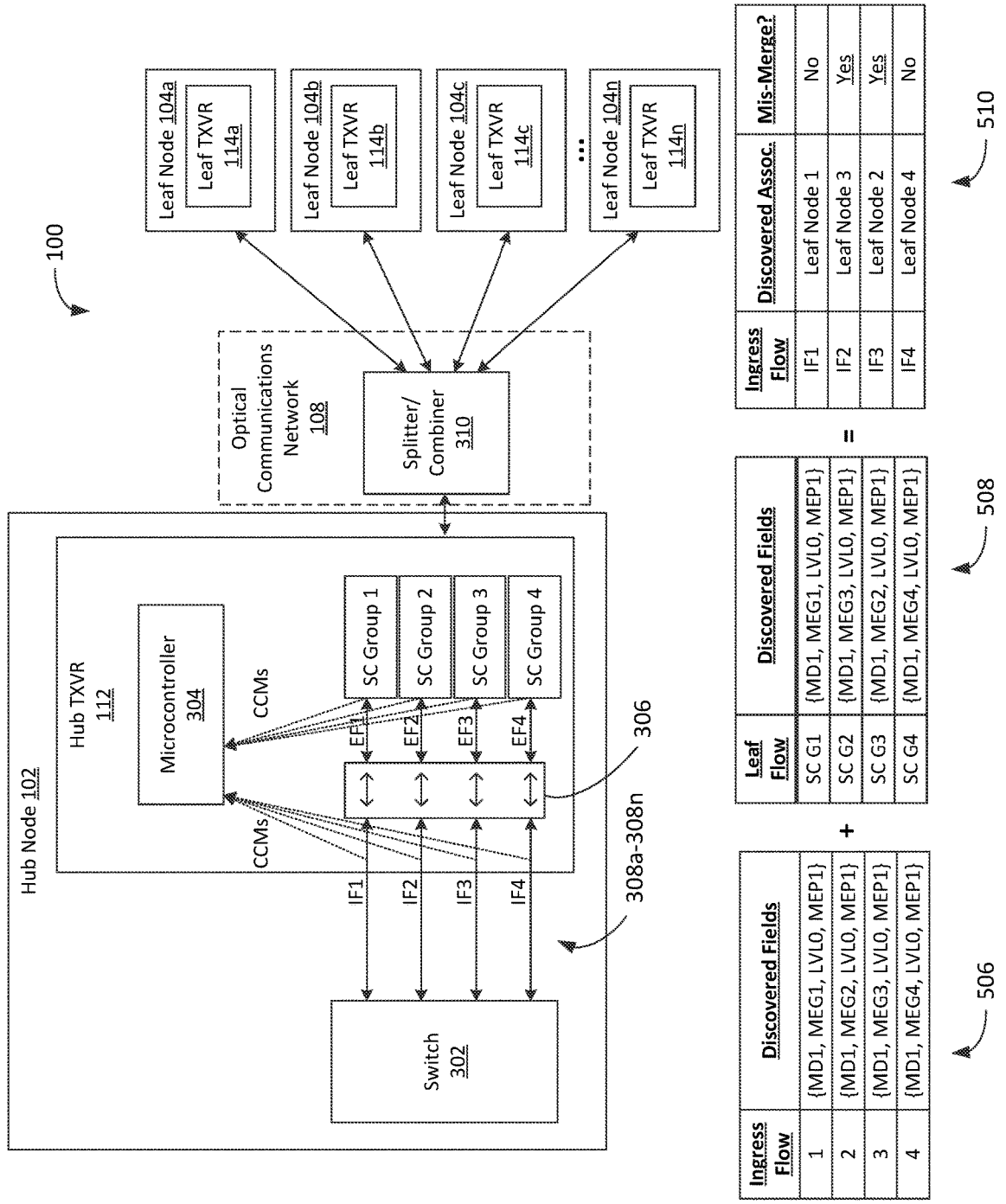
Figure 5C:
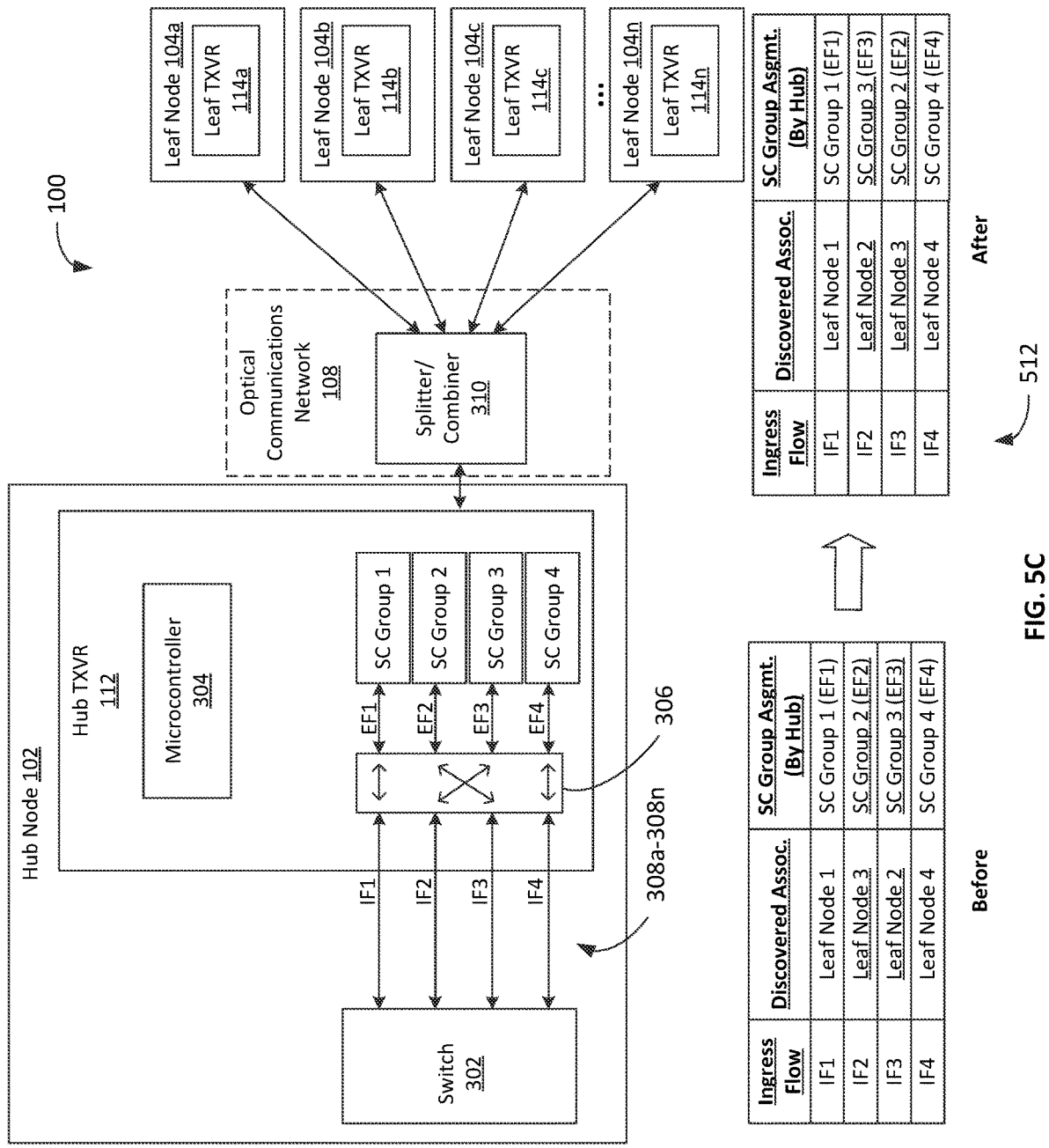

FIGS. 5A-5C show an example process for correcting traffic misconnections using the system 100.

In some implementations, optical subcarriers can be assigned for use by a hub node 102 and several leaf nodes 104a-104n based on an order in which the leaf nodes 104a-104n are connected to the optical communications network 108 and/or to the hub node 102. For instance, in the example shown in FIG. 5A, a first leaf node 104a (e.g., "Leaf Node 1") is the first to connect to the optical communications network 108 and/or to the hub node 102, followed by the third leaf node 104c (e.g., "Leaf Node 3"), followed by the second leaf node 104b (e.g., "Leaf Node 2"), and followed by the fourth leaf node 104d (e.g., "Leaf Node 4"). Accordingly, as shown in the optical subcarrier assignment table 502, the first leaf node 104a can be assigned a first group of optical subcarriers (e.g., "SC Group 1"), the third network node 104c can be assigned a second group of optical subcarriers (e.g., "SC Group 2"), the second network node 104b can be assigned a third group of optical subcarriers (e.g., "SC Group 3"), and the fourth network node 104d can be assigned a fourth group of optical subcarriers (e.g., "SC Group 4").

In some implementations, the optical subcarriers can be assigned by the microcontroller 304. For example, the microcontroller 304 can detect when each of the leaf nodes 104a-104n are connected to the optical communication networks 108 and/or hub node 102 (e.g., when each of the leaf nodes 104a-104n "turn up" on the network), and assign groups of optical subcarriers for exchanging data with those leaf nodes 104a-104n in the order that they are detected.

Further, as shown in FIG. 5A, the hub transceiver 112 can receive several different ingress data flows (e.g., IF1-IF2) from the switch 302 via the ingress network interfaces 308a-308n. For example, as shown in the ingress data flow table 504), the hub transceiver 112 can receive a first ingress data flow IF1 intended to the first leaf node 104a (e.g., from an ingress network interface 308a), a second ingress data flow IF2 intended to the second leaf node 104b (e.g., from an ingress network interface 308b), a third ingress data flow IF3 intended to the third leaf node 104c (e.g., from an ingress network interface 308c), and a fourth ingress data flow IF4 intended to the fourth leaf node 104d (e.g., from an ingress network interface 308d).

The cross connect 306 is configured (e.g., by the microcontroller 304) to route the ingress data flows IF1-IF4, such that optical signals are modulated according to the ingress data flows IF1-IF4 and one or more respective groups of optical subcarriers, depending on the intended destination of the ingress data flows IF1-IF4. However, in some cases, the cross connect 306 may be misconfigured. For example, the cross connect 306 may be configured to route the ingress data flows IF1-IF4, such that at least some of the optical signals are modulated according to one or more groups of optical subcarriers, other than the group of optical subcarriers that are associated with the intended destination.

For example, in the configuration shown in FIG. 5A, the cross connect 306 is configured to output the first ingress data flow IF1 as a first egress data flow EF1, such that an optical signal is modulated according to the first ingress data flow IF1 and the first group of optical subcarriers. Further, the cross connect 306 is configured to output the second ingress data flow IF2 as a second egress data flow EF2, such that an optical signal is modulated according to the second egress data flow EF2 and the second group of optical subcarriers. Further, the cross connect 306 is configured to output the third ingress data flow IF3 as a second egress data flow EF3, such that an optical signal is modulated according to the third egress data flow EF3 and the third group of optical subcarriers. Further, the cross connect 306 is configured to output the fourth ingress data flow IF4 as a fourth egress data flow EF4, such that an optical signal is modulated according to the fourth egress data flow EF4 and the fourth group of optical subcarriers.

As shown in tables 502 and 504, a misconfiguration exists in the routing of data by the cross connect 306 with respect to the second ingress data flow IF2 and the third ingress data flow IF3. For example, the second ingress data flow IF2 should instead be outputted as a third egress data flow EF3 (e.g., such that an optical signal is modulated according to the third group of optical subcarriers, which is assigned for communication with the second leaf node 104b). Further, the third ingress data flow IF3 should instead be outputted as a second egress data flow EF2 (e.g., such that an optical signal is modulated according to the second group of optical subcarriers, which is assigned for communication with the third leaf node 104c).

In some implementations, the system 100 automatically can detect this misconfiguration by monitoring network traffic (e.g., "snooping" the network traffic) that is received by the hub transceiver 112 from the switch 302, and determining the intended destinations of the network traffic. Further, the system 100 can also automatically monitor the network traffic received by the hub transceiver 112 from the leaf nodes 104a-104n, and determine which of the leaf nodes 104a-104n is associated with each group of optical subcarriers.

For example, as shown in FIG. 5B, the microcontroller 304 can monitor traffic from each of the ingress data flows IF1-IF4, such as Continuity Check Messages (CCMs) that are transmitted as a part of the ingress data flows IF1-IF4. In some implementation, the CCMs can included in one or more operations, administration, and management (OAM) packets in the data flows. Each of the CCMs can include information (e.g., data fields) regarding the intended destination of its corresponding ingress data flow IF1.

For instance, a CCM include data fields indicating logical identifiers associated with a particular ingress data flow. Example data fields include a Maintenance Domain (MD) associated with a particular ingress data flow, a Maintenance Association (MA) or (Maintenance Entity Group, MEG) associated with that ingress data flow, a Maintenance Association End Point (MEP) associated with that ingress data flow, and/or a network level associated with that ingress data flow.

In general, MDs are the management space on a network, often owned and operated by a single entity. MDs can be configured with Names and Levels (e.g., eight levels ranging from 0 to 7). A hierarchical relationship can exist between domains based on levels. For example, the larger the domain, the higher the level value.

In general, an MA (or MEG) monitors connectivity of a particular service instance in a given MD, and includes a set of MEPs at the edge of a domain. MAs (or MEGs) can be intended by a Maintenance Association Identifier (MA), such as a "Short MA" Name plus an MD Name.

In general, MEPs includes points at the edge of the domain, and define the boundary for the domain. As discussed above, a MEP can send and receive CFM messages (e.g., through a relay function).

For example, as shown in the ingress monitoring table 506, the microcontroller 304 determines (or "discovers"), based on CCMs from the ingress data flow IF1, that the ingress data flow IF1 is intended for a network node having a first MD (e.g., "MD1"), a first MEG (e.g., "MEG1"), a zeroth network level (e.g., "LVL0"), and a first MEP (e.g., "MEP1"). Further, the microcontroller 304 determines, based on CCMs from the ingress data flow IF2, that the ingress data flow IF2 is intended for a network node having a first MD (e.g., "MD1"), a second MEG (e.g., "MEG2"), a zeroth network level (e.g., "LVL0"), and a first MEP (e.g., "MEP1"). Further, the microcontroller 304 determines, based on CCMs from the ingress data flow IF3, that the ingress data flow IF3 is intended for a network node having a first MD (e.g., "MD1"), a third MEG (e.g., "MEG3"), a zeroth network level (e.g., "LVL0"), and a first MEP (e.g., "MEP1"). Further, the microcontroller 304 determines, based on CCMs from the ingress data flow IF4, that the ingress data flow IF4 is intended for a network node having a first MD (e.g., "MD1"), a fourth MEG (e.g., "MEG4"), a zeroth network level (e.g., "LVL0"), and a first MEP (e.g., "MEP1").

Further, the system 100 can also monitor network traffic (e.g., "snoop" the network traffic) that is received by the hub transceiver 112 from the leaf nodes 104a-104n, and determine which of the leaf nodes 104a-104n is associated with each group of optical subcarriers.

For example, as shown in FIG. 5B, the microcontroller 304 can monitor incoming traffic from each of the leaf nodes 104a-104n (e.g., traffic corresponding to incoming optical signals modulated according to each of the groups of optical subcarriers), CCMs that are transmitted as a part of the incoming traffic. In a similar manner as described above, each of the CCMs can include information (e.g., data fields) regarding the leaf node 104a-104n that is associated with that network traffic. For instance, a CCM can include data fields indicating an MD associated with a data flow from a particular leaf node, an MA or MEG associated with that data flow, an MEP associated with that data flow and/or a network level associated with that data flow.

For example, as shown in the leaf traffic monitoring table 508, the microcontroller 304 determines, based on CCMs transmitted to the hub node 102 according to the first group of optical subcarriers, that the data flow associated with the first group of optical subcarrier corresponds with a network node having a first MD (e.g., "MD1"), a first MEG (e.g., "MEG1"), a zeroth network level (e.g., "LVL0"), and a first MEP (e.g., "MEP1"). Further, the microcontroller 304 determines, based on CCMs transmitted to the hub node 102 according to the second group of optical subcarriers, that the data flow associated with the second group of optical subcarrier corresponds with a network node having a first MD (e.g., "MD1"), a third MEG (e.g., "MEG3"), a zeroth network level (e.g., "LVL0"), and a first MEP (e.g., "MEP1"). Further, the microcontroller 304 determines, based on CCMs transmitted to the hub node 102 according to the third group of optical subcarriers, that the data flow associated with the third group of optical subcarrier corresponds with a network node having a first MD (e.g., "MD1"), a second MEG (e.g., "MEG2"), a zeroth network level (e.g., "LVL0"), and a first MEP (e.g., "MEP1"). Further, the microcontroller 304 determines, based on CCMs transmitted to the hub node 102 according to the fourth group of optical subcarriers, that the data flow associated with the fourth group of optical subcarrier corresponds with a network node having a first MD (e.g., "MD1"), a fourth MEG (e.g., "MEG4"), a zeroth network level (e.g., "LVL0"), and a first MEP (e.g., "MEP1").

In some implementations, the microcontroller 304 can identify each of the leaf nodes 104a-104n by determining whether the information contained in the data fields matches known information regarding the leaf nodes 104a-104n. For example, each of the leaf nodes 104a-104n can be configured to have a particular combination of MD, MA/MEG, MPE, and/or network level. The microcontroller 304 can compare the detected data fields with the known values, and identify a particular leaf node 104a-104n having values that match those of the detect data fields.

Further, the microcontroller 304 can compare the data in the ingress monitoring table 506 and the leaf traffic monitoring table 508, and determine mismatches (or "mismerges") between them. As an example, the microcontroller 304 can identify mismatches between (i) the MD, MA/MEG, network level, and/or MEP associated with an ingress data flow, and (ii) the MD, MA/MEG, network level, and/or MEP associated with the group of optical subcarrier groups to which that ingress data flow is currently assigned.

For instance, in the example shown in FIG. 5B, the microcontroller 304 determines that the ingress data flows IF1 and IF4 are being routed correctly by the cross connect 306 (e.g., as there are no mismatches between the discovered MD, MA/MEG, network level, and MEP data fields for the ingress data flow IF1 and the first group of optical subcarriers. However, the microcontroller 304 determines that the ingress data flows IF2 and IF3 are being routed incorrectly by the cross connect 306. For example, there is a mismatch in the MA/MEG fields for the second ingress data flow IF2 (MEG2) and the second group of optical subcarriers (MEG3). Further, there is a mismatch in the MA/MEG fields for the third ingress data flow IF3 (MEG3) and the third group of optical subcarriers (MEG2). This comparison is summarized in the comparison table 510.

In some implementations, the microcontroller 304 can correct this traffic misconnection by reconfiguring the cross connect 306. For example, the microcontroller 304 can instruct the cross connect 306 output the second ingress data flow IF2 as a third egress data flow EF3, such that an optical signal is modulated according to the third egress data flow EF3 and the third group of optical subcarriers (e.g., which is assigned for communication with the second leaf node 104b). Further, the microcontroller 304 can instruct the cross connect 306 output the third ingress data flow IF3 as a second egress data flow EF2, such that an optical signal is modulated according to the second egress data flow EF2 and the second group of optical subcarriers (e.g., which is assigned for communication with the third leaf node 104c). These modifications are summarized in the reassignment table 512.

Once the cross connect 306 has been reconfigured, each of the ingress traffic flows IF1-IF4 is routed correctly, such that the data included in each of the traffic flows is transmitted to its respective intended leaf node 104a-104n (and vice versa).

As described above, this detection and reconfiguration process can be performed automatically (e.g., without manual input from a human user). For instance, during operation of the system 100, the hub transceiver 112 can monitor traffic (e.g., periodically, continuously intermittently, etc.), and automatically "discover" data fields contained in CCM data fields. Based on these data fields, the hub transceiver 112 can automatically determine associations between ingress data flows and particular groups of optical subcarriers (and their corresponding leaf nodes 104a-104n), and detect mismatches between them. Further, the hub transceiver 112 can automatically adjust the configuration of its cross connect 306, such that these misconnections are corrected. Accordingly, a human user need not manually monitor network traffic, manually parse data fields, manually identify mismatches, nor manually reconfigure the transceivers or other devices of the system 100 to correct traffic misconnections.

In the example shown in FIGS. 5A-5C, a hub transceiver 112 corrects traffic misconnections independent of the leaf nodes 104a-104n (e.g., by using a microcontroller 304 to adjust a cross connect 306 of the hub transceiver 112). However, in some implementations, one or more of the leaf nodes 104a-104n can also correct traffic misconnections, either instead of or in addition to the hub transceiver 112. For instance, in some implementation, the hub transceiver 112 can instruct one or more of the leaf nodes 104a-104n to modulate optical signals and/or demodulate optical signals using different groups of optical subcarriers, such that the misconnections are corrected.

Figure 6:
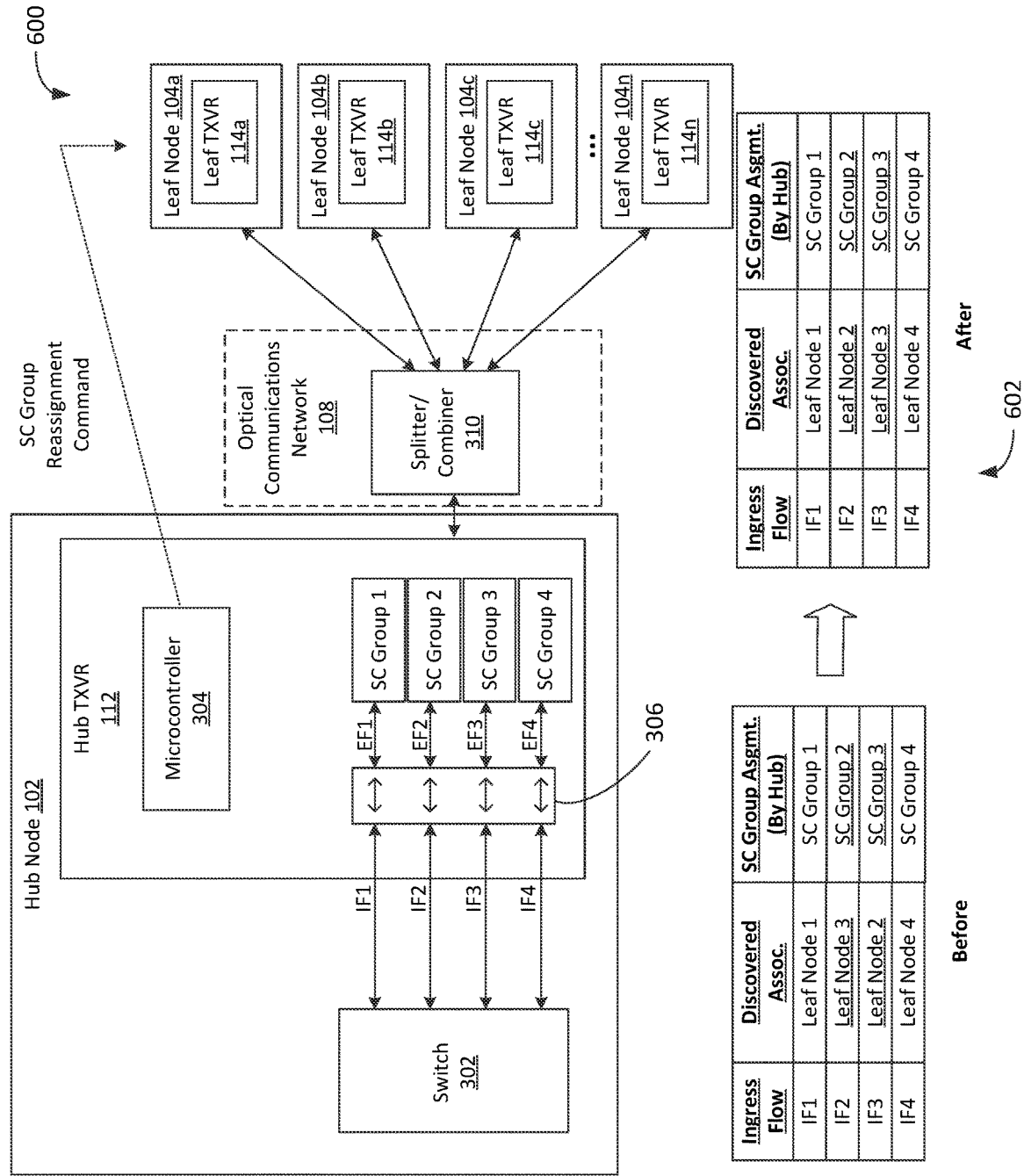
FIG. 6 is a diagram of another example system including network nodes and an optical communications network.

To illustrate, FIG. 6 shows another example system 600. In general, the components of the system 600 can be similar to those described with reference to FIGS. 5A-5C. However, in this example, the microcontroller 304 of the hub transceiver can transmit a command to the second leaf node 104b (e.g., to a microcontroller of the second leaf node 104b) that instructs the second leaf node 104b to modulate optical signals intended for the hub node 102 and/or decode optical signals received by the hub node 102 according to the second group of optical subcarrier (e.g., instead of according to the third group of optical subcarriers). Further, the microcontroller 304 of the hub transceiver can transmit a command to the third leaf node 104c (e.g., to a microcontroller of the third leaf node 104c) that instructs the third leaf node 104c to modulate optical signals intended for the hub node 102 and/or decode optical signals received by the hub node 102 according to the third group of optical subcarrier (e.g., instead of according to the second group of optical subcarriers). These modifications are summarized in the reassignment table 602.

Once the leaf nodes 104b and 104c have been reconfigured, each of the ingress traffic flows IF1-IF4 is routed correctly, such that the data included in each of the traffic flows is transmitted to its respective intended leaf node 104a-104n (and vice versa).

Figure 7A:
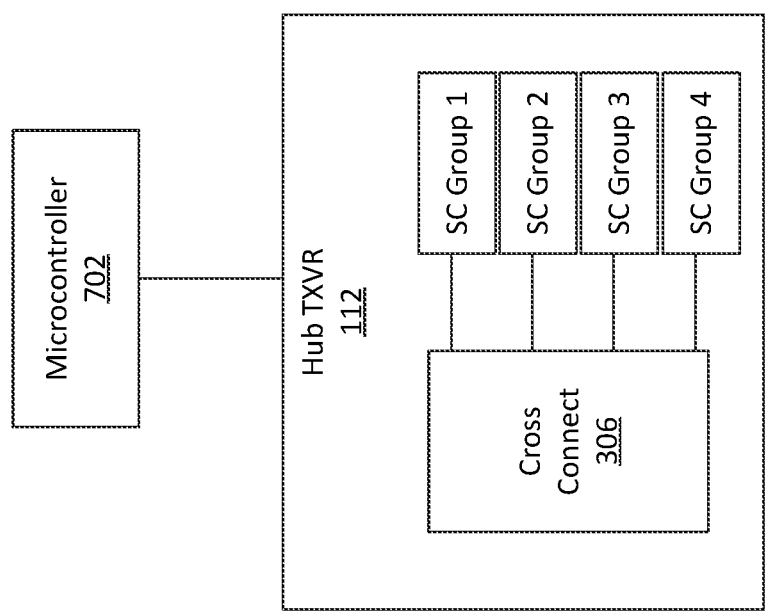
FIGS. 7A and 7B show example arrangements of a microcontroller.

In the examples shown in FIGS. 5A-5C and 6, the microcontroller 304 is implemented as a component of the hub transceiver 112. However, in some implementations, a microcontroller that is separate and distinct from the hub transceiver 112 can be used to correct traffic misconnections in an optical communications network. As an example, as shown in FIG. 7A, a microcontroller 702 can be implemented as a component or group of components that is separate and distinct from the transceiver 112. In some implementations, the microcontroller 702 can be included in the hub node 102. In some implementations, the microcontroller 702 can be implemented as a component or group of components that is separate and distinct from the hub transceiver 112 (e.g., a remote system or device). Similarly, a microcontroller that controls the operation of a leaf transceiver can be implemented as a component or group of components that is separate and distinct from the leaf transceiver and/or the leaf node thereof.

Figure 7B:
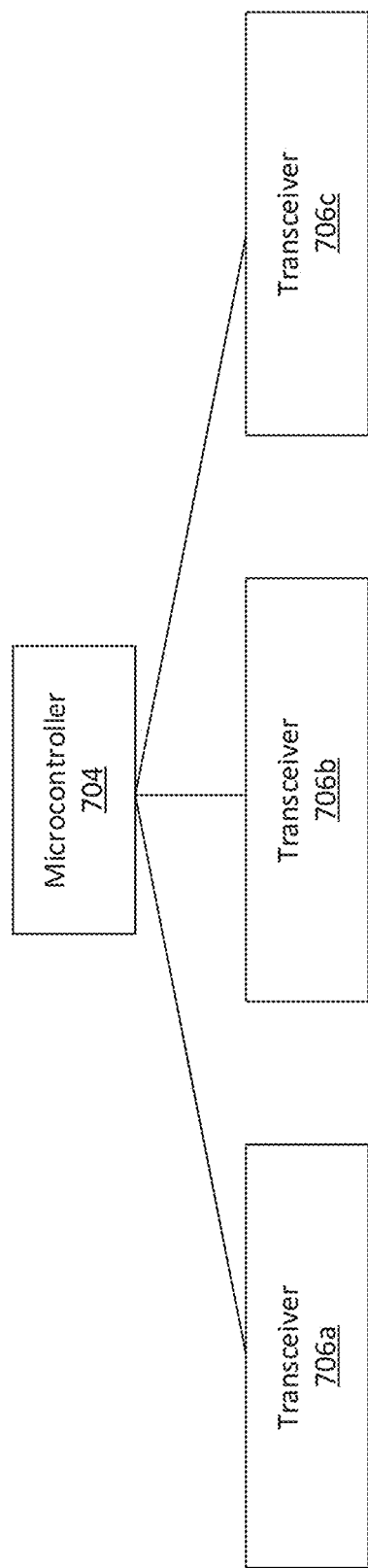

Further, in some implementations, a microcontroller can be implemented as a component or group of components that is separate and distinct from several transceivers. Further, the microcontroller can be configured to control the operations of at least some of those transceivers. As an example, as shown in FIG. 7B, a microcontroller 704 can be implemented as a component or group of components that is separate and distinct from several transceivers 706a-706c. Each of the transceivers 706a-706c can be a hub transceiver (e.g., similar to the hub transceiver 112) and/or a leaf transceiver (e.g., similar to the leaf transceivers 114a-114n). Further, the microcontroller 704 can control the operation of each of the transceivers 706a-706c (e.g., by controlling the configuration of a cross connect of each of the transceivers, instructing each of the transceivers to modulate and/or demodulate optical signals according to a particular group of optical subcarriers, etc.).

In the example shown in FIG. 5A-5C, a microcontroller 304 of the hub transceiver 112 monitors both (i) the network traffic that is received from the switch 302 (e.g., the ingress data flows IF1), and (ii) the network traffic that is received from the leaf nodes 104a-104n (e.g., the traffic corresponding to incoming optical signals modulated according to each of the groups of optical subcarriers). However, in some implementations, one or more of the leaf nodes 104a-104n also can include a respective microcontroller to monitor at least a portion of the traffic. Further, the microcontrollers of the hub node 102 and the leaf nodes 104a-104n can exchange data regarding the monitored traffic (e.g., discovered CCM data fields, as described with reference to FIGS. 5A-5C) to coordinate detecting and correcting misconnections in the optical communications network.

Figure 8:
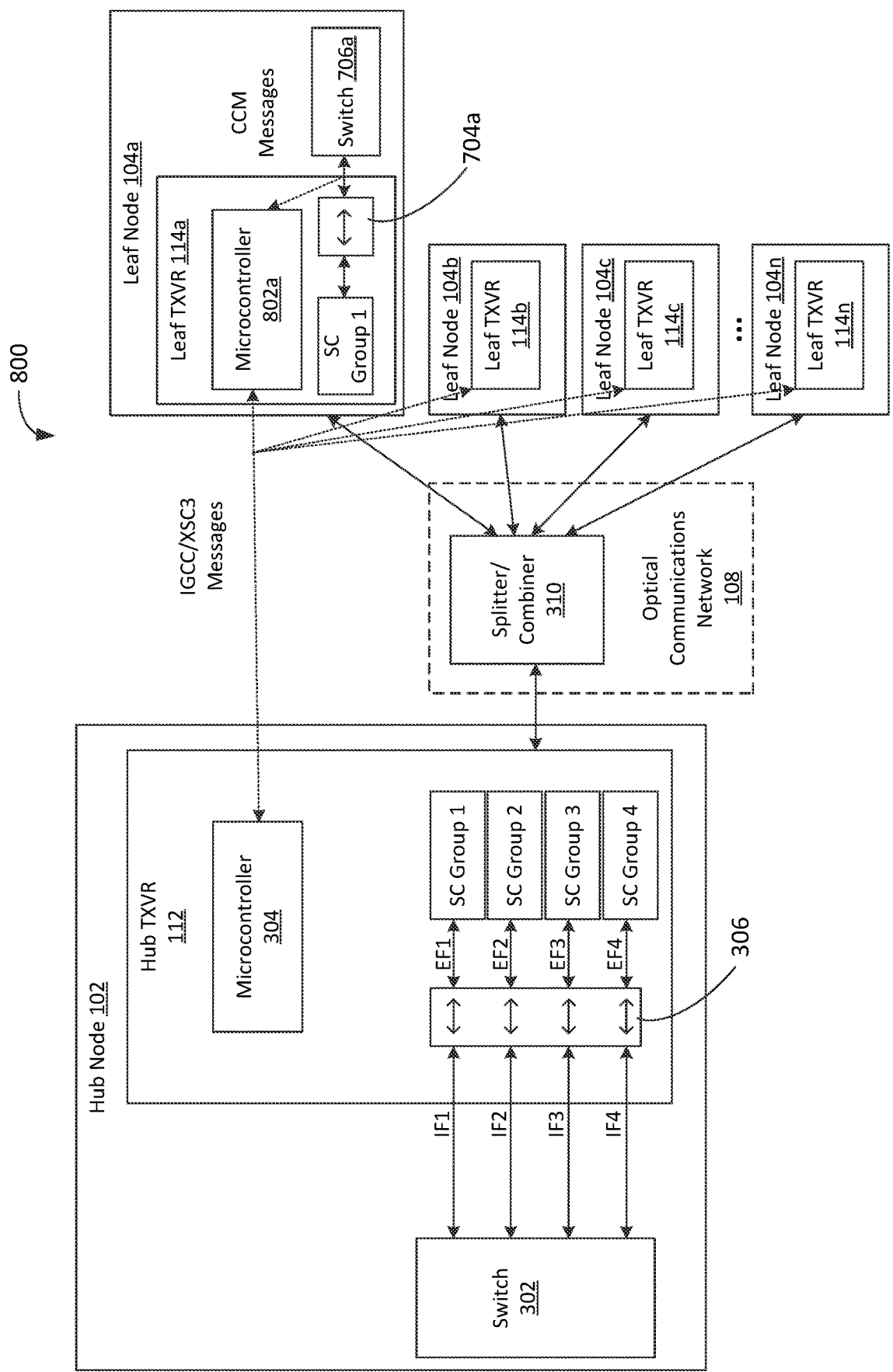
FIG. 8 is a diagram of another example system including network nodes and an optical communications network.

To illustrate, FIG. 8 shows another example system 800. In general, the components of the system 800 can be similar to those described with reference to FIGS. 5A-5C. However, in this example, each of the leaf transceivers 114a includes a respective microcontroller 802a-802n, a respective cross connect 704a-704n, and a respective switch 706a-706n. For ease of illustration only the microcontroller 802a, the cross connect 704a, and the switch 706a of the first leaf node 104a are shown in FIG. 8.

In general, the microcontrollers 802a-802n, the cross connects 704a-704n, and the switches 706a-706n can perform in a similar manner as the microcontroller 304, the cross connect 306, and the switch 302 describes with references to FIGS. 5A-5C.

For example, each of the switches 706a-706n can be configured to route data to respective one of the leaf transceivers 114a-114n and/or receive data from a respective one of the leaf transceivers 114a-114n. In some implementations, a switch 706a-706n can receive data from the leaf node 104a-104n thereof and/or from other network nodes, and provide at least some of the data to the leaf transceiver 114a-114n for transmission to the hub node 102. In some implementations, a switch 706a-706n can transmit and/or receive data according to a Layer 2 (L2) or a Layer 3 (L3) of a network architecture (e.g., an architecture having a seven layer Open Systems Interconnection (OSI) network model).

As another example, each of the microcontrollers 802a-802n can control a respective one of the cross connects 704a-704n, such that data that is received from a respective one of the switches 706a-706n (e.g., via respective ingress network interfaces) is used to modulate optical signals according to one of the groups of optical subcarriers, depending on the intended destination of that data.

Further, in the example shown in FIG. 8, each of the microcontrollers 802a-802n can monitor network traffic (e.g., "snoop" the network traffic) that is received by the respective leaf transceiver 114a-114n by the respective switch 706a-706n, and determine one or more data fields (e.g., CCM data fields) in the network traffic. In a similar manner as described above (e.g., with reference to FIGS. 5A-5C), each of the CCMs can include data fields regarding the leaf node 104a-104n that is associated with that network traffic. For instance, a CCM can include data fields indicating an MD associated with a data flow from a particular leaf node, an MA or MEG associated with that data flow, an MEP associated with that data flow and/or a network level associated with that data flow.

As an example, as shown in FIG. 8, the microcontroller 802a can monitor traffic that is transmitted from the switch 706a to the leaf transceiver 114a, such as CCMs that are transmitted as a part of the network traffic. The microcontroller 802a can determine, based on CCMs, that the data flow associated with the first group of optical subcarrier corresponds with a network node having a particular MD, MA/MEG, network level, and MEP. The microcontroller 802a can transmit at least some of the determined information to the microcontroller 304 (e.g., using a GCC, such as an IGCC or XSC channel between the leaf transceiver 114a and the hub transceiver 112). Each of the other microcontrollers 802b-802n can also determine similar information regarding the network traffic received by each of the other leaf nodes 104b-104n, and transmit at least some of that information to the microcontroller 304. Further, in some implementations, the microcontroller 304 can determine information regarding each of the ingress data flows IF1-IF2 (e.g., as described with reference to FIGS. 5A-5C), and transmit at least some of the determined information to one or more of the microcontrollers 802a-802n.

Based on the received information, the microcontroller 304 can adjust the configuration of its own cross connect 306 (e.g., as described with reference to FIGS. 5A-5C) and/or instruct one or more of the leaf nodes 104a-104n to adjust their configurations (e.g., as described with reference to FIG. 6).

Thus, in some implementations, a single microcontroller (e.g., the microcontroller 304) can monitor traffic between several network nodes, and automatically adjust the configurations of one or more the network nodes to correct traffic misconnections (e.g., as described with reference to FIGS. 5A-5C and 6). Further, in at least some implementations, multiple microcontrollers (e.g., the microcontrollers 304 and 802a-802n) can collectively monitor network traffic between several network nodes, and provide information regarding the network traffic to one or more microcontrollers to facilitate the correction of traffic misconnections (e.g., as described with reference to FIG. 8).

In some implementations, multiple microcontrollers can monitor network traffic, and provide information regarding the network traffic to a central control system to facilitate the correction of traffic misconnections.

Figure 9:
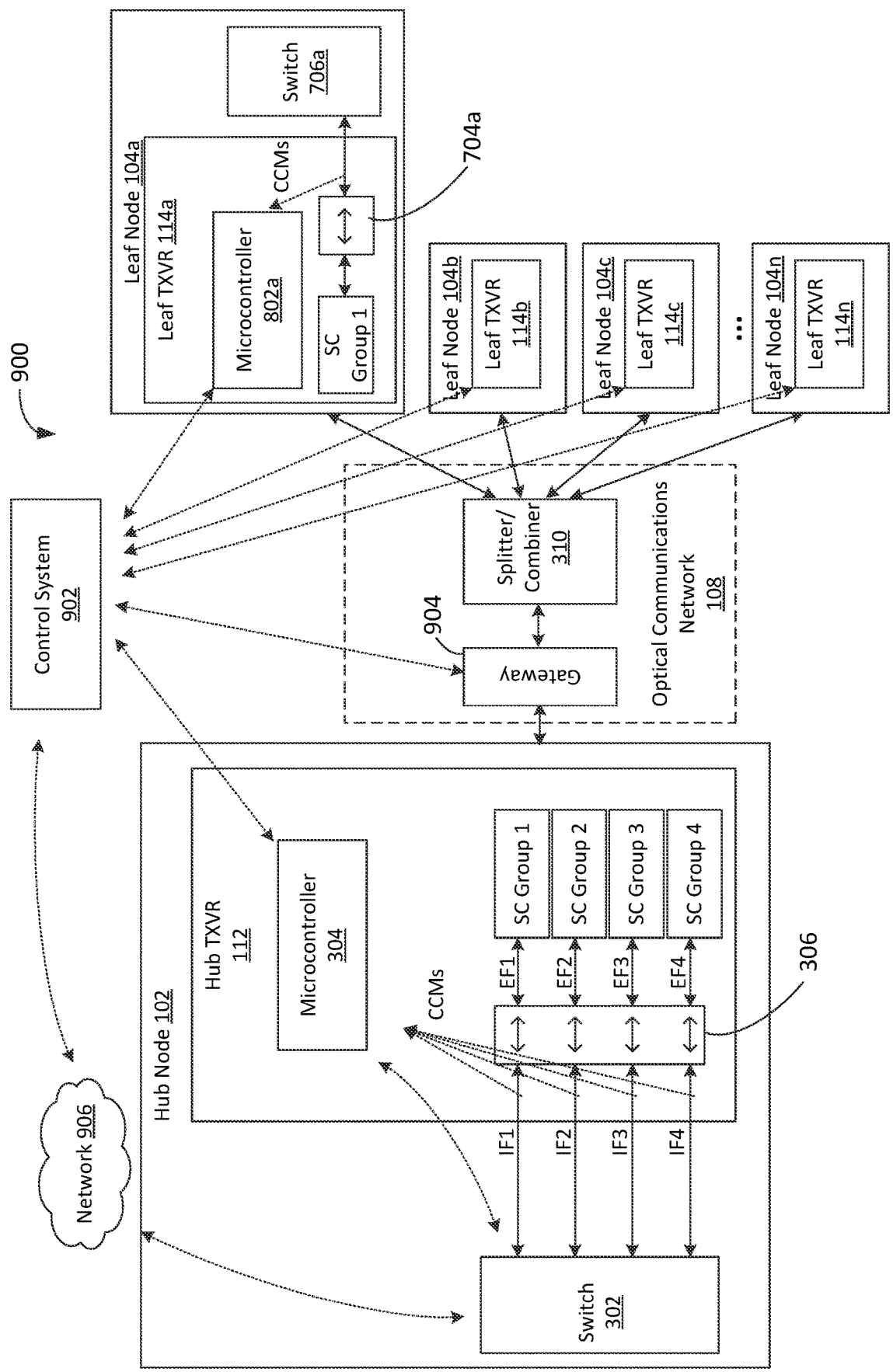
FIG. 9 is a diagram of another example system including network nodes and an optical communications network.

To illustrate, FIG. 9 shows another example system 900. In general, the components of the system 900 can be similar to those described with reference to FIG. 8. However, in this example, the system 900 also includes a control system 902 communicatively coupled to each of the microcontrollers 304 and 802a-802n.

As described above (e.g., with reference to FIGS. 5A-5C, 6, and 8), each of the microcontrollers 304s and 802a-802n can be configured to monitor network traffic, such as CCMs that are transmitted as a part of the network traffic, and determine one or more data fields (e.g., CCM data fields) in the network traffic. Each of the microcontrollers 304s and 802a-802n can transmit at least some of the determined information regarding the network traffic to the control system 902.

The control system 902 receives the information regarding the network traffic, and automatically adjust the configurations of one or more the network nodes to correct traffic misconnections. As an example, the control system 902 can transmit one or more commands to the hub transceiver 112 (e.g., to the microcontroller 304) that instructs the hub transceiver 112 to adjust a configuration of the cross connect 306 to correct one or more traffic misconnections (e.g., in a similar manner as described with reference to FIGS. 5A-5C). As another example, the control system 902 can transmit one or more commands to the leaf transceivers 114a-114n (e.g., to the microcontrollers 802a-802n) that instructs the leaf transceiver 114a-144n to modulate and/or demodulate optical signals according to different groups of optical subcarriers to correct one or more traffic misconnections (e.g., in a similar manner as described with reference to FIG. 6).

In some implementations, at least some of the commands can be transmitted to the hub transceiver 112 and/or leaf transceivers 114a-114n directly (e.g., via a direct wire or fiber connection between them).

In some implementations, at least some of the commands can be transmitted to the hub transceiver 112 and/or the leaf transceivers 114a-114n via an optical gateway 904 of the optical communications network 108. For example, the control system 902 can transmit commands intended for one of more of the hub transceiver 112 and/or leaf transceivers 114a-114n to the optical gateway 904, and the optical gateway 904 can broadcast the commands to each of the hub transceiver 112 and the leaf transceivers 114a-114n. Further, each of the hub transceiver 112 and the leaf transceivers 114a-114n can monitor the network traffic for commands that are broadcast by the control system 902, identify commands that are directed to that hub transceiver 112 or leaf transceiver 114a-114n, and execute the identified commands (while ignoring the commands directed to the other transceivers).

In some implementations, at least some of the commands can be transmitted to the hub transceiver 112 and/or the leaf transceivers 114a-114n via another network 906 that is separate and distinct from the optical communications network 108. For example, the control system 902 can transmit commands intended for one of more of the hub transceiver 112 and/or leaf transceivers 114a-114n to the switch 302 of the hub node 102 via the network 906. In turn, the hub node 102 can execute the command (if the command is intended for the hub node 102) and/or transmit the command to one or more of the leaf nodes 104a-104n via the optical communications network 108 (e.g., if the command is intended for one or more of the leaf nodes 104a-104n). As another example, the control system 902 can transmit commands intended for one of more of the hub transceiver 112 and/or leaf transceivers 114a-114n to a switch 706a-70n of a leaf node 104a-104n via the network 906. In response, the leaf node 104a-104n can execute the command and/or transmit the command to one or more of the other network nodes via the optical communications network 108.

Figure 10:
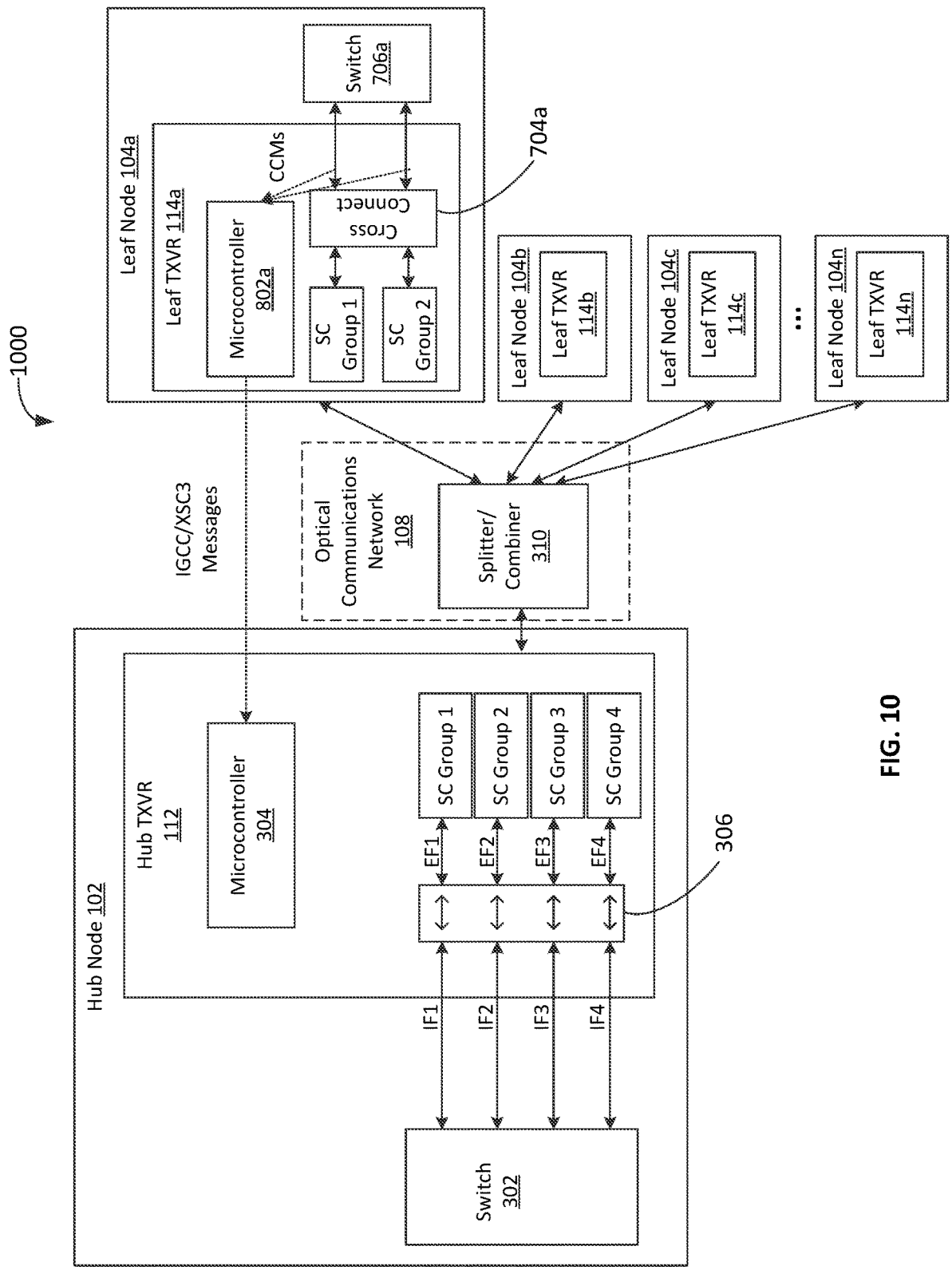
FIG. 10 is a diagram of another example system including network nodes and an optical communications network.

In the examples shown in FIGS. 9 and 10, each of the leaf nodes 104a-104n includes a respective switch 706a-706n (e.g., for routing data from another device to the cross connect 704a-704n and/or for routing data from the cross connect 704a-704n to another device). In some implementations, each of the leaf nodes 104a-104n also can be configured to modulate and/or demodulate optical signals according to multiple groups of optical subcarriers, depending on the source and/or intended destination of the data (e.g., similar to the functionality described with reference to the hub transceiver 112 and the cross connect 306).

For example, as shown in FIG. 10, the cross connect 704a can receive first data intended for a first destination, and route the first data using the cross connect 704a such that an optical signal is modulated in accordance with the first data and a first group of optical subcarriers. Further, the cross connect 704a can receive second data intended for a second destination, and route the second data using the cross connect 704a such that an optical signal is modulated in accordance with the second data and a second group of optical subcarriers.

Figure 11A:
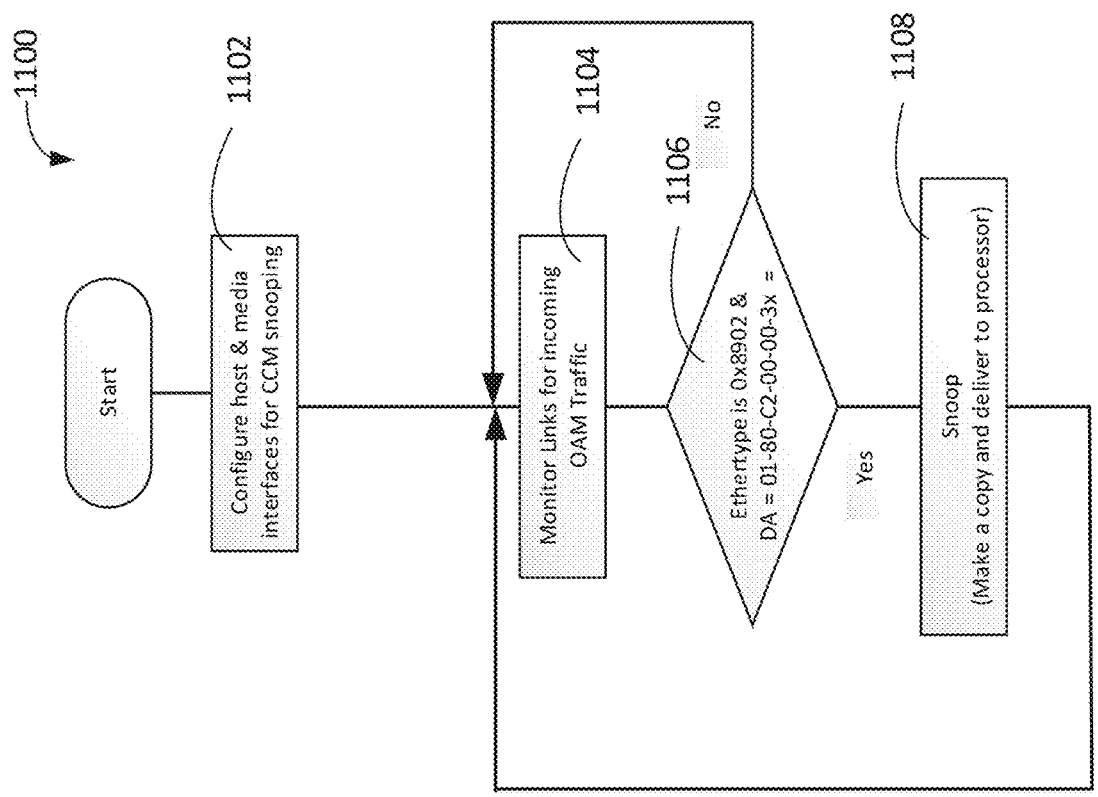
FIG. 11A is a flow chart diagram of an example process that can be performed using one or more of the systems described herein.

An example process 1100 for monitoring network traffic is shown in FIG. 11A. The process 1100 can be performed, at least in part, using the systems described herein (e.g., the systems 100, 600, 800, 900, and/or 1000), such as by one or more digital signal processors (DSPs) of the transceivers, the microcontrollers, and/or the control systems.

According to the process 1100, a system configures ingress and egress network interfaces for CCM snooping (e.g., monitoring of network traffic) (block 1102). The interfaces can include, for example, one or more ingress network interfaces and/or egress network interfaces.

Further, the system monitors links for incoming operations, administration, and management (OAM) traffic (block 1104). In some implementations, OAM traffic can include one or more CCMs (e.g., as described above).

Further, the system determines whether a packet of the OAM traffic satisfies certain criteria (block 1106). As an example, the system can verify that the packet is indeed OAM traffic based on the Ethertype of the traffic (e.g., a field in an Ethernet frame of the traffic) and/or the destination address (DA) of the traffic. For instance, the system can determine whether the Ethertype of the traffic includes a specific value that indicates that the traffic is OAM traffic, such as 0x8092. Further, the system can determine whether the DA of the packet is a particular address that indicates that the traffic is OAM traffic, such as 01-80-C2-00-00-3x.

If the packet does not satisfy these criteria, the system continues the monitor the links for incoming OAM traffic (block 1104).

If the frame satisfies these criteria, the system snoop the packet (e.g., makes a copy of the packet and delivers the packet to a processor, such as microcontroller or a central control system) (block 1108).

Figure 11B:
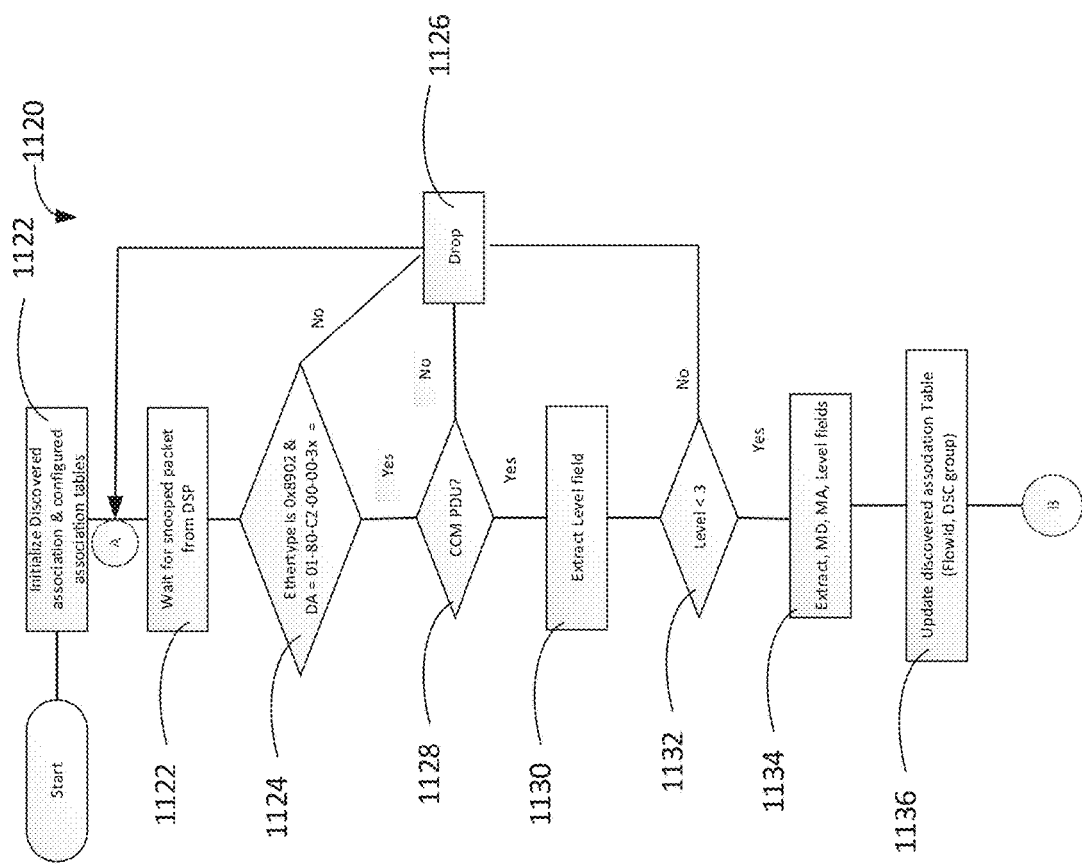
FIGS. 11B and 11C are flow chart diagram of another example process that can be performed using one or more of the systems described herein.
Figure 11C:
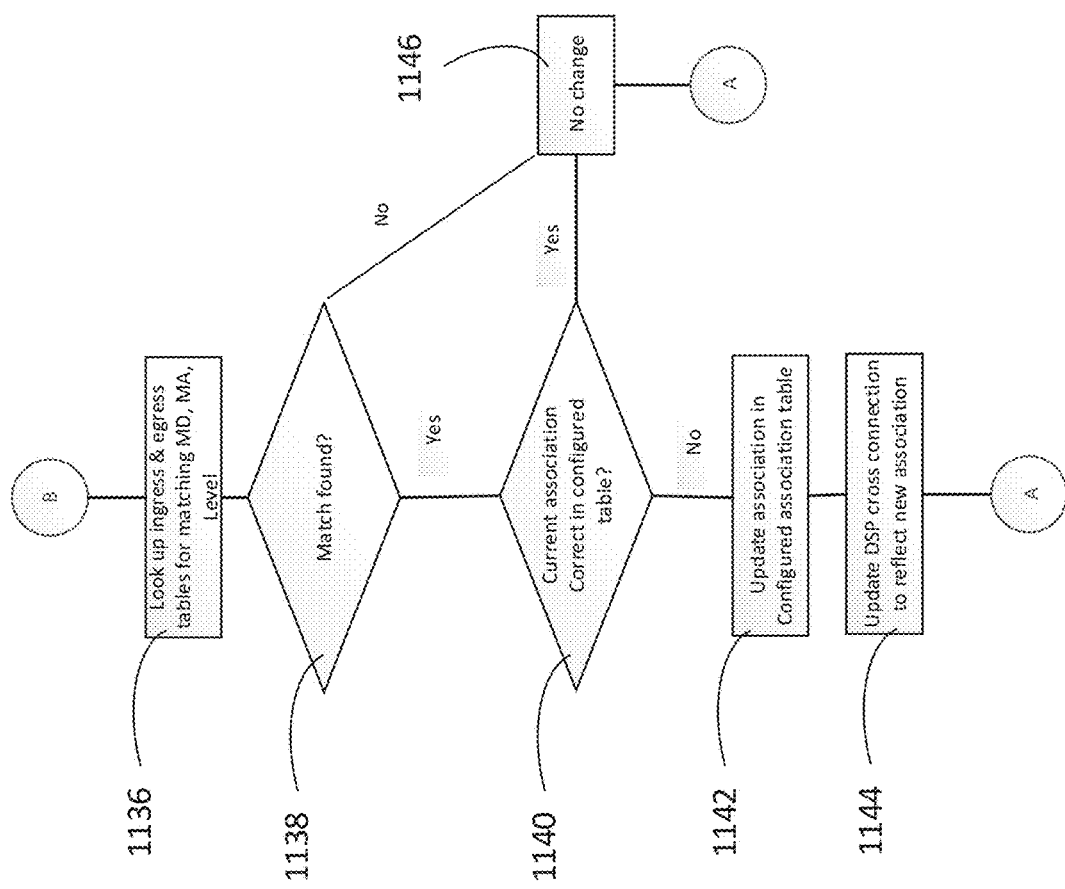

An example process 1120 for extracting information regarding snooped packets is shown in FIGS. 11B and 11C. The process 1120 can be performed, at least in part, using the systems described herein (e.g., the systems 100, 600, 800, 900, and/or 1000), such as by one or more digital signal processors (DSPs) of the transceivers, the microcontrollers, and/or the control systems.

According to the process 1120, a system initializes data tables (block 1122). For example, the system can initialize a data for storing discovered associations between data flows and network nodes and configured associated between data flows and network nodes (e.g., similar to the tables 502, 504, 506, 508, 510, 512, and/or 602).

Further, the system waits for the packet of a snooped packet (block 1122) (e.g., a snooped packet from the process 1100).

Upon receiving the snooped packet, the system determines whether the packet satisfies certain criteria (block 1124). As an example, the system can verify that the packet is OAM traffic based on the Ethertype of the traffic and/or the DA of the packet. For instance, the system can determine whether the Ethertype of the packet includes a specific value that indicates that the packet is OAM traffic, such as 0x8092. Further, the system can determine whether the GA of the packet is a particular address that indicates that the packet is OAM traffic, such as 01-80-C2-00-00-3x.

For example, the system can determine whether the Ethertype (e.g., a field in an Ethernet frame) of the snooped packet includes a specific value, such as 0x8092. Further, the system can determine whether a destination address (DA) of the snooped packet is 01-80-C2-00-00-3x.

If the packet does not satisfy these criteria, the system drops the packet (block 1126) and waits for additional snooped packets (block 1124).

If the frame satisfies these criteria, the system determines whether the packet is a CCM Protocol Data Unit (PDU) (block 1128).

If the packet is not a CCM PDU, the system drops the packet (block 1126) and waits for additional snooped packets (block 1124).

If the frame is a CCM PDU, the extracts a network level field of the packet (block 1130), and determines whether the network level field of the packet is less than 3 (block 1132).

If the network level field of the packet is not less than 3, the system drops the packet (block 1126) and waits for additional snooped packets (block 1134).

If the network level field of the packet is less than 3, the system updates the discovered association table with information from the data fields of the packet (block 1136). For example, the system can update the table with an identifier of a data flow associated with the packet, an indication of the group of optical subcarriers associated with the packet, the MD indicated in the packet, the MA/MEG indicated in the packet, the network level indicated in the packet, and/or the MEP indicated in the packet.

Further, the system determines matching values in the data tables (block 1138) and the characteristics of a network node. For example, the system can determine whether the combination of MD, MA/MEG, network levels, MEP, etc. in data tables match with the known MD, MA/MEG, network levels, MEP, etc. of a network node on the optical communication network.

If a match is found (block 1136), the system determine whether the matched network node (e.g., the network node matching the values in the data tables) is correctly configured (block 1140). For example, as described with reference to FIG. 5A-5C, the system may determine that the network node that is associated with a particular data flow and/or a particular set of optical subcarriers, should instead be associated with a different data flow and/or a different set of optical subcarriers (e.g., due to a misconfiguration of "mis-merge" on the optical communications network).

If the system determines that the matched network node is misconfigured, the system can update the data tables with the correct configuration (block 1142) and update a configuration of a cross connect to reflect the correct configuration (block 1144).

If the system determines that the match network node is correct configured (or that the values in the data tables do not match the values of any known network nodes), no further action is taken with respect to that packet (block 1146), and the system again waits for a snooped packet (block 1122).

II. Example Processes for Performing the Techniques Described Herein

Figure 12A:
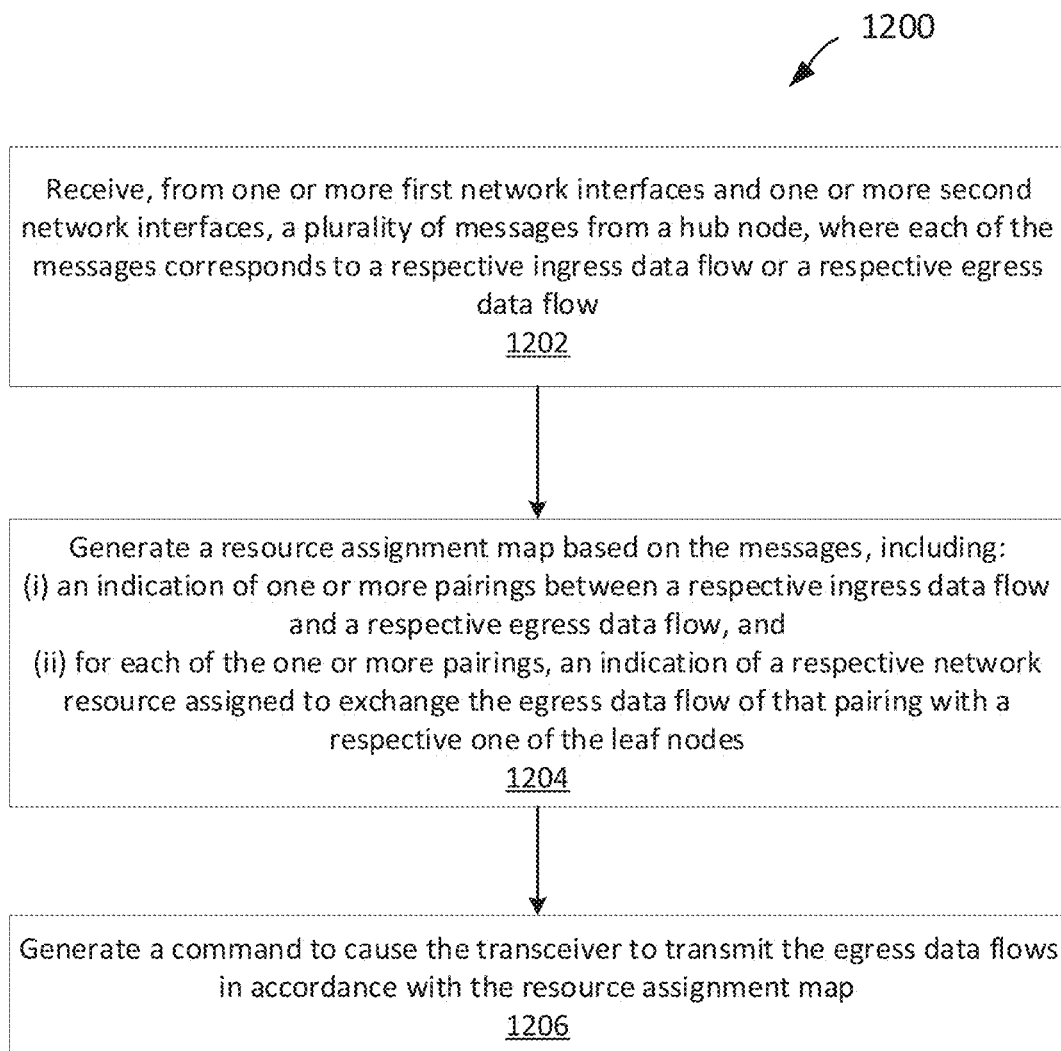
FIGS. 12A-12C are flow chart diagrams of further example processes that can be performed using one or more of the systems described herein.

FIG. 12A shows an example process 1200 that can be performed using one or more of the systems described herein.

In some implementations, the process 1200 can be performed, at least in part, by a system that includes a transceiver and a microcontroller. The transceiver can include one or more first network interfaces (e.g., one or more Serializer/Deserializers, SerDes) configured to be communicatively coupled to a hub node of an optical communications network, one or more second network interfaces (e.g., SerDes) configured to be communicatively coupled to a plurality of leaf nodes of the optical communications network, and a cross connect configured to interconnect the one or more first network interfaces selectively with the one or more second network interfaces. The microcontroller can be communicatively coupled to the one or more first network interfaces, the one or more second network interfaces, and the cross connect.

In some implementations, the transceiver can include the microcontroller. In some implementations, the microcontroller can be remote from the transceiver.

According to the process 1200, the system, receives a plurality of first messages from the hub node via the one or more first network interfaces (block 1202). Each of the first messages corresponds to a different respective ingress data flow between the hub node and the transceiver.

In some implementations, the first messages can include one or more Continuity Check Messages (CCMs) transmitted from the hub node to the transceiver. In some implementations, the first messages can include one or more Ethernet Operations, Administration, and Maintenance (OAM) messages Further, the system determines, for each of the ingress data flows, and based on the first messages, one or more respective first logical identifiers associated with that ingress data flow (block 1204). The one or more first logical identifiers associated with that ingress data flow can include an indication of a Maintenance Domain (MD) associated with that ingress data flow, an indication of a Maintenance Association (MA) associated with that ingress data flow, an indication of a Maintenance Association End Point (MEP) associated with that ingress data flow, and/or an indication of a network level associated with that ingress data flow.

Further, the system receives a plurality of second messages from the leaf nodes via the one or more second network interfaces (block 1206). Each of the second messages corresponds to a different respective egress data flow between the transceiver and a respective one of the leaf nodes.

In some implementations, the second messages can include one or more CCMs transmitted from the leaf nodes to the transceiver. In some implementations, the second messages can include one or more Ethernet OAM messages. In some implementations, the second messages can include one or more general communication channel (GCC) messages (e.g., IGCC messages and/or XSC3 messages).

Further, the system determines, for each of the egress data flows, and based on the second messages, one or more second logical identifiers associated with that egress data flow (block 1208). For each of the egress data flows, the one or more second logical identifiers associated with that egress data flow can include an indication of an MD associated with that egress data flow, an indication of an MA associated with that egress data flow, an indication of an MEP associated with that egress data flow, and/or an indication of a network level associated with that egress data flow.

Further, the system generates a resource assignment map based on the first logical identifiers and the second logical identifiers (block 1210). A resource assignment map can include, for example, one or more of the tables described with reference to FIGS. 5A-5C and 6 (e.g., the tables 512 and/or 602).

Further, the system generates a command to cause the transceiver to transmit the egress data flows in accordance with the resource assignment map (block 1212). The resource assignment map can include an indication of one or more pairings between a respective one of the ingress data flows and a respective one of the egress data flows. The resource assignment map also can include, for each of the pairings, an indication of a respective network resource assigned to transmit the egress data flow of the pairing to a respective one of the leaf nodes.

The network resource can include a plurality of optical subcarriers for transmitting data over the optical communications network. The optical subcarriers can include Nyquist subcarriers.

In some implementations, the microcontroller can be further configured to modify the resource assignment map based on the first logical identifiers and the second logical identifiers. Modifying the resource assignment map can include, for at least one of the pairings, modifying the network resource assigned to the pairing.

Figure 12B:
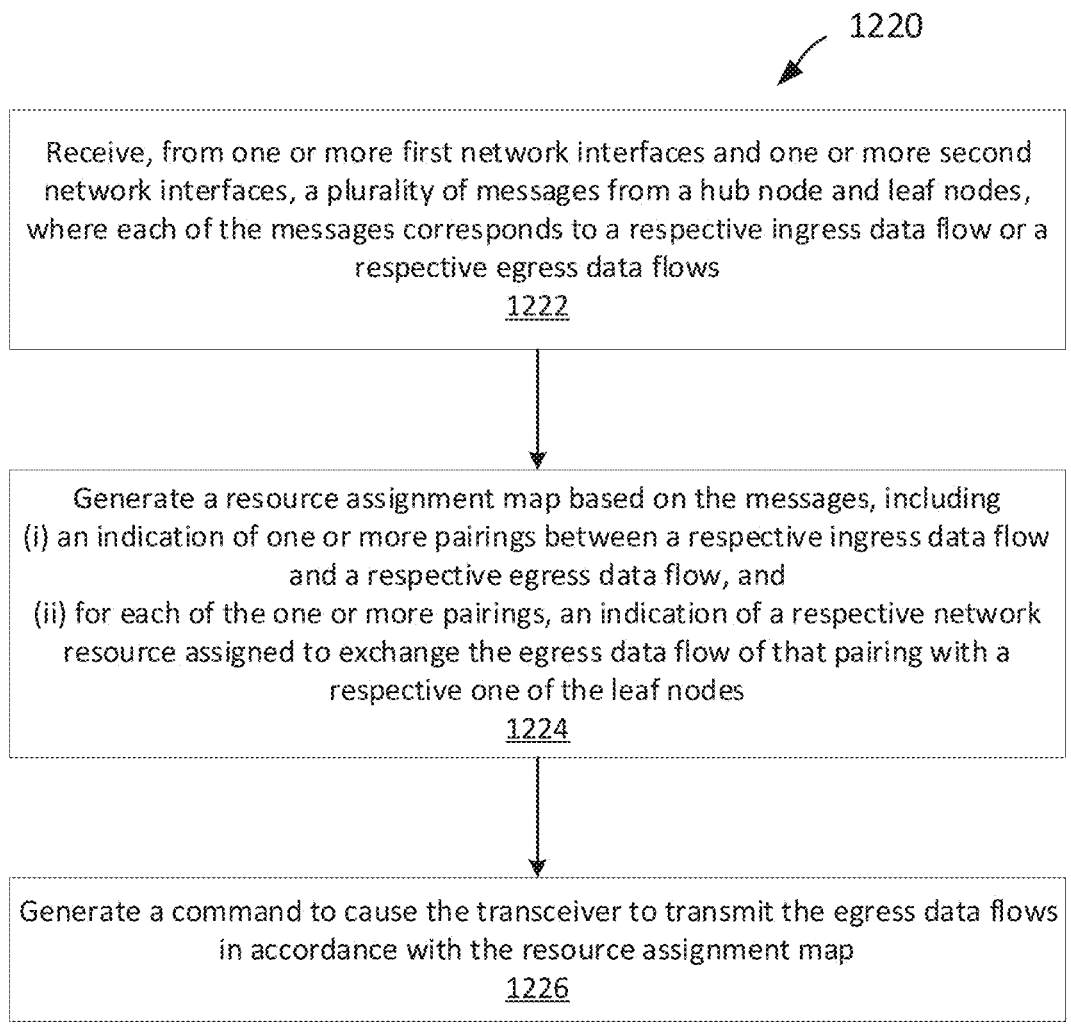

FIG. 12B shows another example process 1220 that can be performed using one or more of the systems described herein.

In some implementations, the process 1220 can be performed, at least in part, by a system that includes a transceiver and a microcontroller. The transceiver can include one or more first network interfaces (e.g., one or more Serializer/Deserializers, SerDes) for exchanging one or more ingress data flows with a hub node of an optical communications network, and one or more second network interfaces (e.g., SerDes) for exchanging one or more egress data flows with a plurality of leaf nodes of the optical communications network. The microcontroller can be communicatively coupled to the one or more first network interfaces and the one or more second network interfaces.

According to the process 1220, the system receives, via the one or more first network interfaces and the one or more second network interfaces, a plurality of messages from the hub node and the leaf nodes (block 1222). Each of the messages corresponds to a respective one of the one or more ingress data flows or a respective one of the one or more egress data flows.

In some implementations, the messages can include one or more Continuity Check Messages (CCMs) transmitted from the hub node to the transceiver. In some implementations, the messages can include one or more CCMs transmitted from the leaf nodes to the transceiver.

In some implementations, at least one of the messages can be an Ethernet Operations, Administration, and Maintenance (OAM) message. In some implementations, at least one of the messages can conform with the Institute of Electrical and Electronics Engineers (IEEE) 802.1Q-2018 technical standard. In some implementations, at least one of the messages can be a general communication channel (GCC) message.

Further, the system generates a resource assignment map based on the messages (block 1224). The resource assignment map includes an indication of one or more pairings between a respective one of the one or more ingress data flows and a respective one of the one or more egress data flows. The resource assignment map also includes, for each of the one or more pairings, an indication of a respective network resource assigned to exchange the egress data flow of that pairing with a respective one of the leaf nodes. A resource assignment map can include, for example, one or more of the tables described with reference to FIGS. 5A-5C and 6 (e.g., the tables 512 and/or 602).

Further, the system generates a command to cause the transceiver to transmit the one or more egress data flows in accordance with the resource assignment map (block 1226)

Figure 12C:
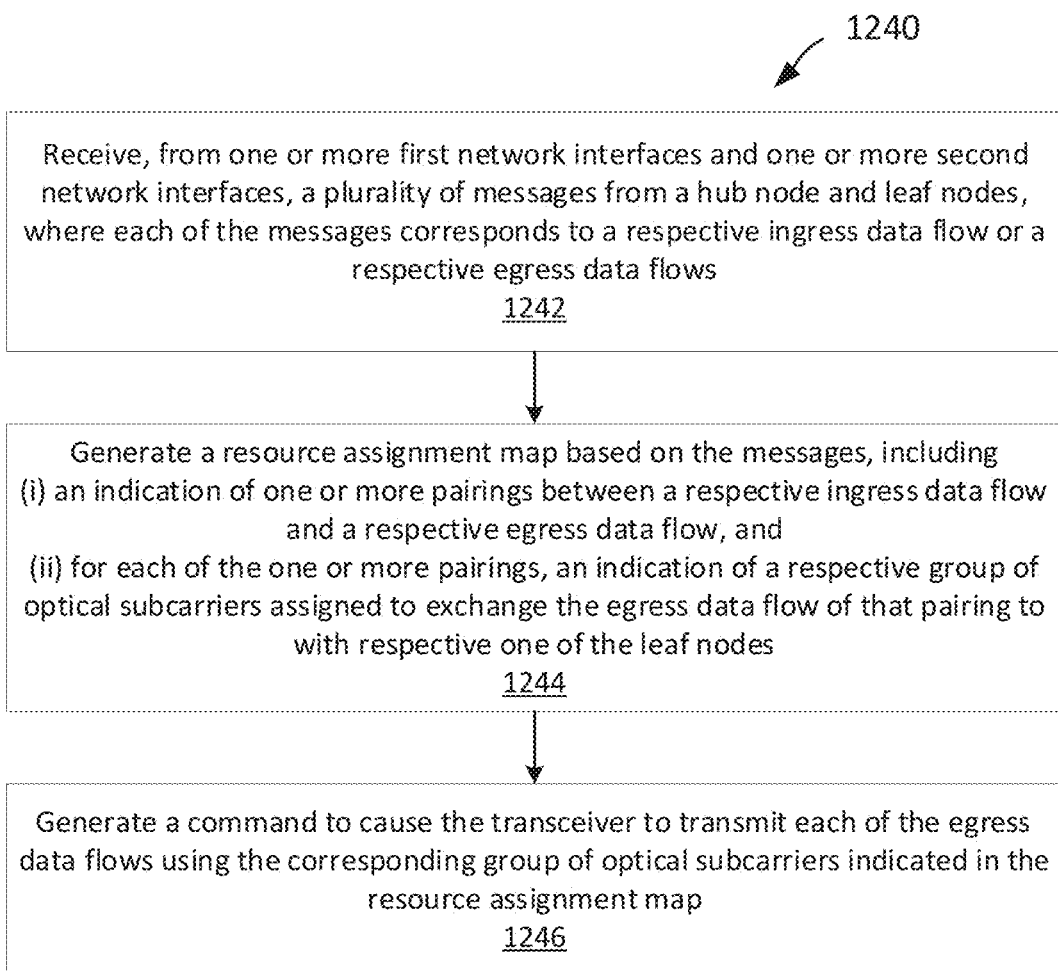

FIG. 12C shows another example process 1240 that can be performed using one or more of the systems described herein.

In some implementations, the process 1240 can be performed, at least in part, by a system that includes a transceiver and a microcontroller. The transceiver can include one or more first network interfaces (e.g., one or more Serializer/Deserializers, SerDes) for exchanging one or more ingress data flows with a hub node of an optical communications network, and one or more second network interfaces (e.g., SerDes) for exchanging one or more egress data flows with a plurality of leaf nodes of the optical communications network. The microcontroller can be communicatively coupled to the one or more first network interfaces and the one or more second network interfaces.

According to the process 1240, a system receives, from the one or more first network interfaces and the one or more second network interfaces, a plurality of messages from the hub node and the leaf nodes (block 1242). Each of the messages corresponds to a respective one of the one or more ingress data flows or a respective one of the one or more egress data flows.

The system generates a resource assignment map based on the messages (block 1244). The resource assignment map can include an indication of one or more pairings between a respective one of the one or more ingress data flows and a respective one of the one or more egress data flows. The resource assignment map also can include, for each of the one or more pairings, an indication of a respective group of optical subcarriers assigned to exchange the egress data flow of that pairing to with respective one of the leaf nodes.

The system generates a command to cause the transceiver to transmit each of the one or more egress data flows using the corresponding group of optical subcarriers indicated in the resource assignment map (block 1246).

In some implementations, at least one of the groups of optical subcarriers can include a single respective optical subcarrier.

In some implementations, at least one of the groups of optical subcarriers can include a plurality of respective optical subcarriers.

In some implementations, each of the groups of optical subcarriers can include one or more respective Nyquist subcarriers.

III. Example Computer Systems

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, some or all of the components described herein can be implemented using digital electronic circuitry, or in computer software, firmware, or hardware, or in combinations of one or more of them. In another example, the processes 1100, 1120, 1200, 1220, and/or 1240 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium also can be, or can be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows also can be performed by, and apparatus also can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 13:
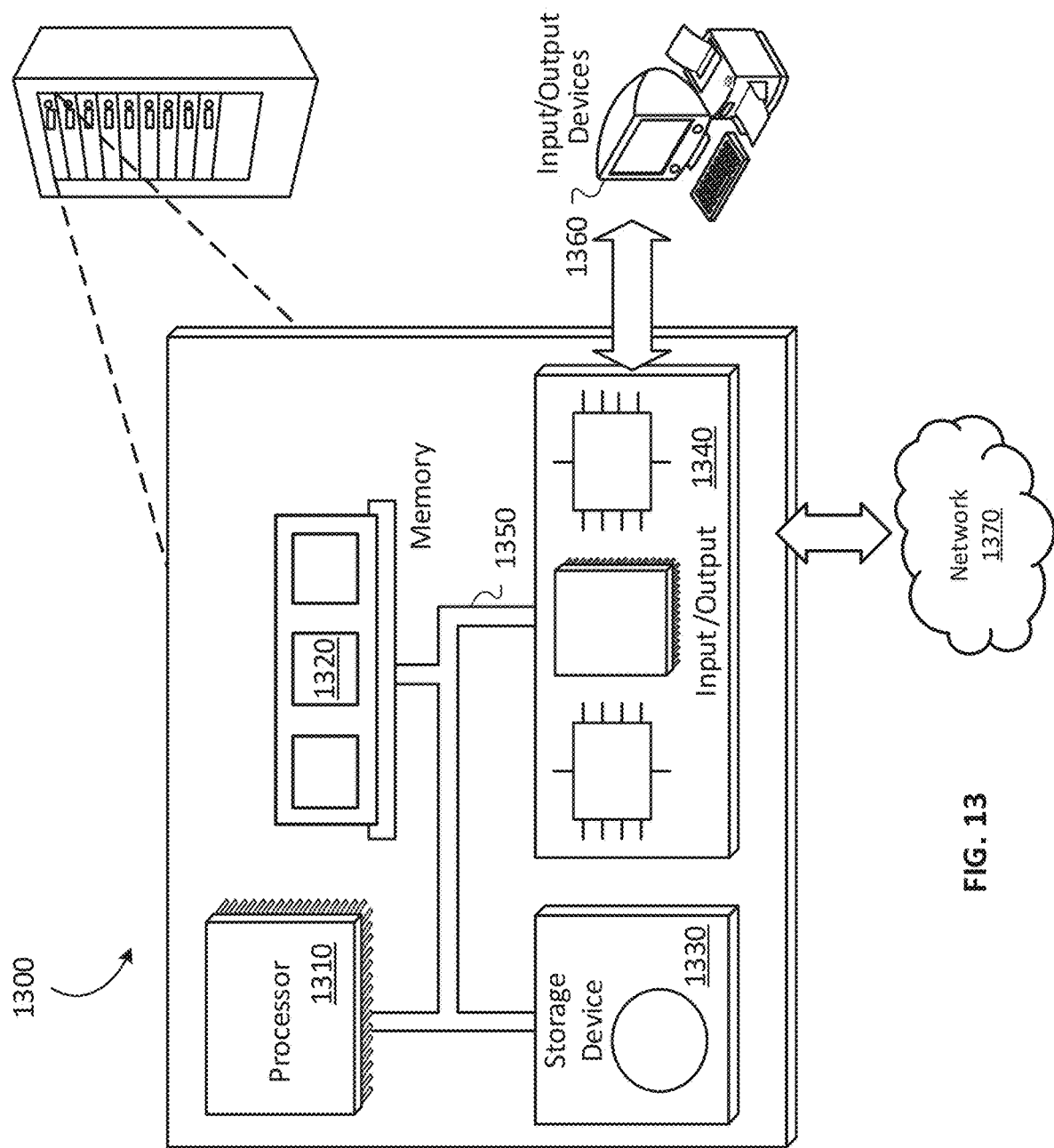
FIG. 13 is a diagram of an example computer system.

FIG. 13 shows an example computer system 1300 that includes a processor 1310, a memory 1320, a storage device 1330 and an input/output device 1340. Each of the components 1310, 1320, 1330 and 1340 can be interconnected, for example, by a system bus 1350. The processor 1310 is capable of processing instructions for execution within the system 1300. In some implementations, the processor 1310 is a single-threaded processor, a multi-threaded processor, or another type of processor. The processor 1310 is capable of processing instructions stored in the memory 1320 or on the storage device 1330. The memory 1320 and the storage device 1330 can store information within the system 1300.

The input/output device 1340 provides input/output operations for the system 1300. In some implementations, the input/output device 1340 can include one or more of a network interface device, e.g., an Ethernet card, a serial communication device, e.g., an RS-232 port, and/or a wireless interface device, e.g., an 802.11 card, a 3G wireless modem, a 4G wireless modem, a 5G wireless modem, etc. for communicating with a network 1270 (e.g., via one or more network devices, such as switches, routers, and/or other network devices). In some implementations, the input/output device can include driver devices configured to receive input data and send output data to other input/output devices, e.g., keyboard, printer and display devices 1360. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations also can be combined in the same implementation. Conversely, various features that are described in the context of a single implementation also can be implemented in multiple embodiments separately or in any suitable sub-combination.

A number of implementations have been described. Nevertheless, it will be understood that various modifications may be made without departing from the spirit and scope of the invention. Accordingly, other implementations also are within the scope of the claims.

What is claimed is:

1. A system comprising:
   a transceiver comprising:
      one or more first network interfaces for exchanging one or more ingress data flows with a hub node of an optical communications network, and
      one or more second network interfaces for exchanging one or more egress data flows with a plurality of leaf nodes of the optical communications network; and
   a microcontroller communicatively coupled to the one or more first network interfaces and the one or more second network interfaces, wherein the microcontroller is configured to:
      receive, from the one or more first network interfaces and the one or more second network interfaces, a plurality of messages from the hub node and the leaf nodes, wherein each of the messages corresponds to a respective one of the one or more ingress data flows or a respective one of the one or more egress data flows;
      generate a resource assignment map based on the messages, wherein the resource assignment map comprises:
         an indication of one or more pairings between a respective one of the one or more ingress data flows and a respective one of the one or more egress data flows, and
         for each of the one or more pairings, an indication of a respective network resource assigned to exchange the egress data flow of that pairing with a respective one of the leaf nodes; and
      generate a command to cause the transceiver to transmit the one or more egress data flows in accordance with the resource assignment map.

2. The system of claim 1, wherein the messages comprise one or more Continuity Check Messages (CCMs) transmitted from the hub node to the transceiver.

3. The system of claim 1, wherein the messages comprise one or more Continuity Check Messages (CCMs) transmitted from the leaf nodes to the transceiver.

4. The system of claim 1, wherein at least one of the messages is an Ethernet Operations, Administration, and Maintenance (OAM) message.

5. The system of claim 1, wherein at least one of the messages conforms with the Institute of Electrical and Electronics Engineers (IEEE) 802.1Q-2018 technical standard.

6. The system of claim 1, wherein at least one of the messages is a general communication channel (GCC) message.

* * * * *